US012173477B2

(12) United States Patent
Shibata et al.

(10) Patent No.: US 12,173,477 B2
(45) Date of Patent: Dec. 24, 2024

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Yuuji Shibata, Tokyo (JP); Yusuke Fujii, Tokyo (JP)

(73) Assignee: KOMATSU LTD., Tokyo (JP)

( * ) Notice: Subject to any disclaimer, the term of this patent is extended or adjusted under 35 U.S.C. 154(b) by 239 days.

(21) Appl. No.: 17/788,077

(22) PCT Filed: Dec. 9, 2020

(86) PCT No.: PCT/JP2020/045857
§ 371 (c)(1),
(2) Date: Jun. 22, 2022

(87) PCT Pub. No.: WO2021/131701
PCT Pub. Date: Jul. 1, 2021

(65) Prior Publication Data

US 2023/0022248 A1 Jan. 26, 2023

(30) Foreign Application Priority Data

Dec. 27, 2019 (JP) ................................ 2019-239545

(51) Int. Cl.
*E02F 9/22* (2006.01)
*F15B 11/024* (2006.01)
(Continued)

(52) U.S. Cl.
CPC .......... *E02F 9/2292* (2013.01); *E02F 9/2203* (2013.01); *E02F 9/2228* (2013.01);
(Continued)

(58) Field of Classification Search
CPC ..... E02F 9/2228; E02F 9/2239; E02F 9/2242; E02F 9/2292; E02F 9/2296; F15B 11/024;
(Continued)

(56) References Cited

U.S. PATENT DOCUMENTS 6,877,417 B2 * 4/2005 Shimada ............... F15B 11/024 91/437
7,448,309 B2 * 11/2008 Bitter .................. F15B 11/0445 91/418
(Continued)

FOREIGN PATENT DOCUMENTS

JP S47-10283 U 10/1972
JP 2010-275818 A 12/2010
(Continued)

OTHER PUBLICATIONS

Office Action dated Sep. 12, 2023, issued in the corresponding Australian patent application No. 2020414631.

*Primary Examiner* — Michael Leslie
(74) *Attorney, Agent, or Firm* — Locke Lord LLP

(57) ABSTRACT

A control system for a work machine includes a plurality of hydraulic pumps that discharge hydraulic oil, a hydraulic cylinder that moves a working equipment element, a plurality of flow rate control valves that are respectively connected to the hydraulic pumps and adjust a flow rate of the hydraulic oil supplied to the hydraulic cylinder, a plurality of supply flow paths respectively connected to the of flow rate control valves, a meter-in flow path that connects a collective part of the supply flow paths and an inlet of the hydraulic oil in the hydraulic cylinder, a plurality of discharge flow paths respectively connected to the flow rate control valves, a meter-out flow path that connects a collective part of the discharge flow paths and an outlet of the
(Continued)

hydraulic oil in the hydraulic cylinder, and a throttle disposed in the meter-out flow path.

7 Claims, 9 Drawing Sheets

(51) Int. Cl.
*F15B 11/044* (2006.01)
*F15B 11/17* (2006.01)
*E02F 3/43* (2006.01)

(52) U.S. Cl.
CPC .......... *E02F 9/2296* (2013.01); *F15B 11/044* (2013.01); *E02F 3/435* (2013.01); *F15B 11/024* (2013.01); *F15B 2011/0246* (2013.01); *F15B 11/17* (2013.01); *F15B 2211/20576* (2013.01); *F15B 2211/3058* (2013.01); *F15B 2211/46* (2013.01)

(58) Field of Classification Search
CPC .... F15B 11/0413; F15B 11/0445; F15B 11/17
See application file for complete search history.

(56) References Cited

U.S. PATENT DOCUMENTS

| | | | | |
|---|---|---|---|---|
| 7,487,707 | B2 * | 2/2009 | Pfaff | F15B 13/0433 91/437 |
| 9,664,209 | B2 * | 5/2017 | Kawasaki | F15B 11/024 |
| 9,845,813 | B2 * | 12/2017 | Shimizu | F15B 11/044 |
| 10,161,423 | B2 * | 12/2018 | Rampen | F15B 11/162 |
| 10,801,524 | B2 * | 10/2020 | Nakano | E02F 9/2285 |
| 11,143,210 | B1 * | 10/2021 | Lee | F15B 11/0406 |
| 11,608,610 | B2 * | 3/2023 | Nackers | E02F 9/2242 |
| 2003/0145721 | A1 | 8/2003 | Oka et al. | |
| 2014/0130488 | A1 | 5/2014 | Sugano et al. | |
| 2015/0152900 | A1 | 6/2015 | Egawa et al. | |
| 2018/0087243 | A1 | 3/2018 | Ito et al. | |
| 2018/0106278 | A1 | 4/2018 | Amano et al. | |
| 2018/0119388 | A1 * | 5/2018 | Egawa | E02F 9/2235 |
| 2020/0056350 | A1 | 2/2020 | Shirouzu et al. | |

FOREIGN PATENT DOCUMENTS

| | | | |
|---|---|---|---|
| JP | 2014-98403 | A | 5/2014 |
| JP | 2018-028358 | A | 2/2018 |
| WO | 2018151275 | A1 | 8/2018 |

* cited by examiner

WORK MACHINE CONTROL SYSTEM, WORK MACHINE, AND WORK MACHINE CONTROL METHOD

FIELD

The present disclosure relates to a work machine control system, a work machine, and a work machine control method.

BACKGROUND

In a technical field related to a work machine, a hydraulic control device as disclosed in Patent Literature 1 is known. In Patent Literature 1, the hydraulic control device includes a control valve that adjusts a flow rate of hydraulic oil supplied to a hydraulic cylinder and a variable throttle disposed in a meter-out flow path of the hydraulic cylinder. The flow rate of the hydraulic oil discharged from the hydraulic cylinder to a tank is adjusted by disposing the variable throttle in the meter-out flow path. The cylinder speed is adjusted by adjusting the flow rate of the hydraulic oil.

CITATION LIST

Patent Literature

Patent Literature 1: JP 2018-028358 A

SUMMARY

Technical Problem

In a case where a plurality of control valves are connected to one hydraulic cylinder, the hydraulic oil flowing out from the hydraulic cylinder is discharged to the tank via the meter-out flow path. If the variable throttle is not properly disposed, the flow rate of the hydraulic oil may be excessively limited. If the flow rate of the hydraulic oil is excessively limited, the cylinder speed excessively decreases, and as a result, work efficiency may decrease.

An object of the present disclosure is to suppress a decrease in work efficiency.

Solution to Problem

According to an aspect of the present invention, a control system for a work machine comprises: a plurality of hydraulic pumps that discharge hydraulic oil; a hydraulic cylinder that moves a working equipment element; a plurality of flow rate control valves that are respectively connected to the plurality of hydraulic pumps and adjust a flow rate of the hydraulic oil supplied to the hydraulic cylinder; a plurality of supply flow paths respectively connected to the plurality of flow rate control valves; a meter-in flow path that connects a collective part of the plurality of supply flow paths and an inlet of the hydraulic oil in the hydraulic cylinder; a plurality of discharge flow paths respectively connected to the plurality of flow rate control valves; a meter-out flow path that connects a collective part of the plurality of discharge flow paths and an outlet of the hydraulic oil in the hydraulic cylinder; and a throttle disposed in the meter-out flow path.

Advantageous Effects of Invention

According to the present disclosure, it is possible to suppress a decrease in work efficiency.

DESCRIPTION OF EMBODIMENTS

Hereinafter, embodiments according to the present disclosure will be described with reference to the drawings, but the present disclosure is not limited thereto. The components of the embodiments described below can be appropriately combined. Some components are not used in some cases.

Work Machine

Figure 1:
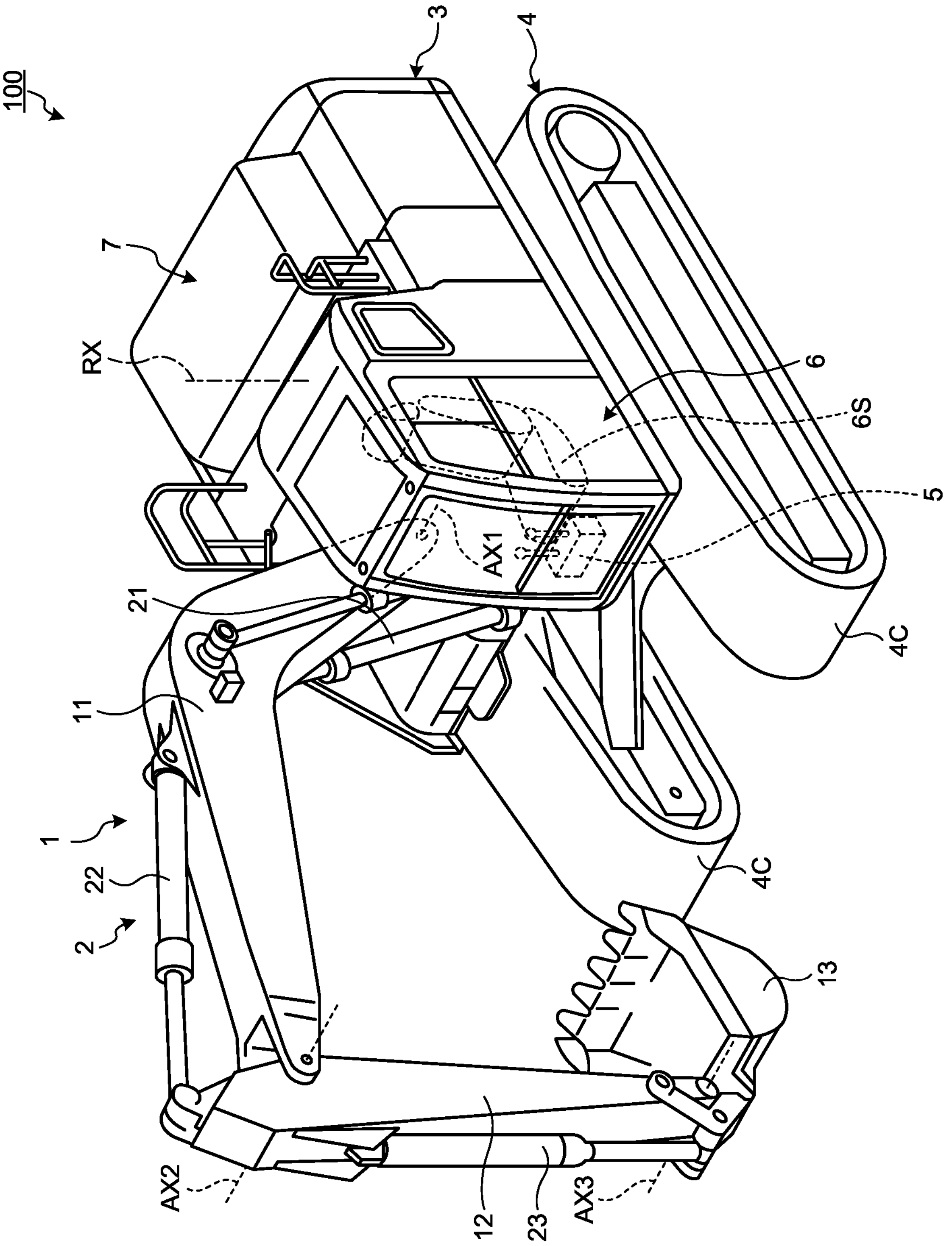
FIG. 1 is a perspective view illustrating a work machine according to an embodiment.

FIG. 1 is a perspective view illustrating a work machine 100 according to an embodiment. In the embodiment, an example in which the work machine 100 is an excavator will be described. In the following description, the work machine 100 is appropriately referred to as an excavator 100.

As illustrated in FIG. 1, the excavator 100 includes a working equipment 1, a hydraulic cylinder 2, a swing body 3, a travel body 4, and an operation device 5.

The swing body 3 supports the working equipment 1. The swing body 3 swings around a swing axis RX. The swing body 3 swings with power generated by a swing motor (not illustrated). The swing body 3 includes an operation room 6 and a machine room 7. An operator of the excavator 100 boards the operation room 6. An operator's seat 6S on which the operator sits is provided in the operation room 6.

The travel body 4 supports the swing body 3. The travel body 4 includes a pair of crawler belts 4C. The crawler belts 4C are rotated with power generated by a travel motor (not illustrated). The excavator 100 travels with the rotation of the crawler belts 4C. The travel body 4 may include a tire attached to an axle.

The working equipment 1 is supported by the swing body 3. The working equipment 1 includes a plurality of relatively movable working equipment elements. The working equipment elements of the working equipment 1 include a boom 11 coupled to the swing body 3, an arm 12 coupled to the boom 11, and a bucket 13 coupled to the arm 12.

The boom 11 and the swing body 3 are coupled via a boom pin. The boom 11 is supported by the swing body 3 to be rotatable around a rotation axis AX1.

The boom 11 and the arm 12 are coupled via an arm pin. The arm 12 is supported by the boom 11 to be rotatable around a rotation axis AX2.

The arm 12 and the bucket 13 are coupled via a bucket pin. The bucket 13 is supported by the arm 12 to be rotatable around a rotation axis AX3.

The rotation axis AX1, the rotation axis AX2, and the rotation axis AX3 are parallel to each other. The rotation axis AX1 and an axis parallel to the swing axis RX are orthogonal to each other. In the following description, a direction parallel to the swing axis RX is appropriately referred to as a vertical direction of the swing body 3, a direction parallel to the rotation axis AX1 is appropriately referred to as a vehicle width direction or a horizontal direction of the swing body 3, and a direction orthogonal to both the rotation axis AX1 and the swing axis RX is appropriately referred to as a front-rear direction of the swing body 3. The direction in which the working equipment 1 is present with reference to the swing axis RX is a front direction. The direction in which the machine room 7 is present with reference to the swing axis RX is a rear direction.

The hydraulic cylinder 2 moves the working equipment elements based on a hydraulic oil. A plurality of hydraulic cylinders 2 are provided to move respective working equipment elements. The hydraulic cylinders 2 include a boom cylinder 21 that moves the boom 11, an arm cylinder 22 that moves the arm 12, and a bucket cylinder 23 that moves the bucket 13.

The operation device 5 is operated by the operator of the excavator 100. The operation device 5 is operated to move the working equipment 1 and the swing body 3. The operation device 5 is disposed in the operation room 6. The operation device 5 includes a plurality of operation levers. The working equipment 1 and the swing body 3 are moved by the operation of the operation device 5.

Motion of Working Equipment

Figure 2:
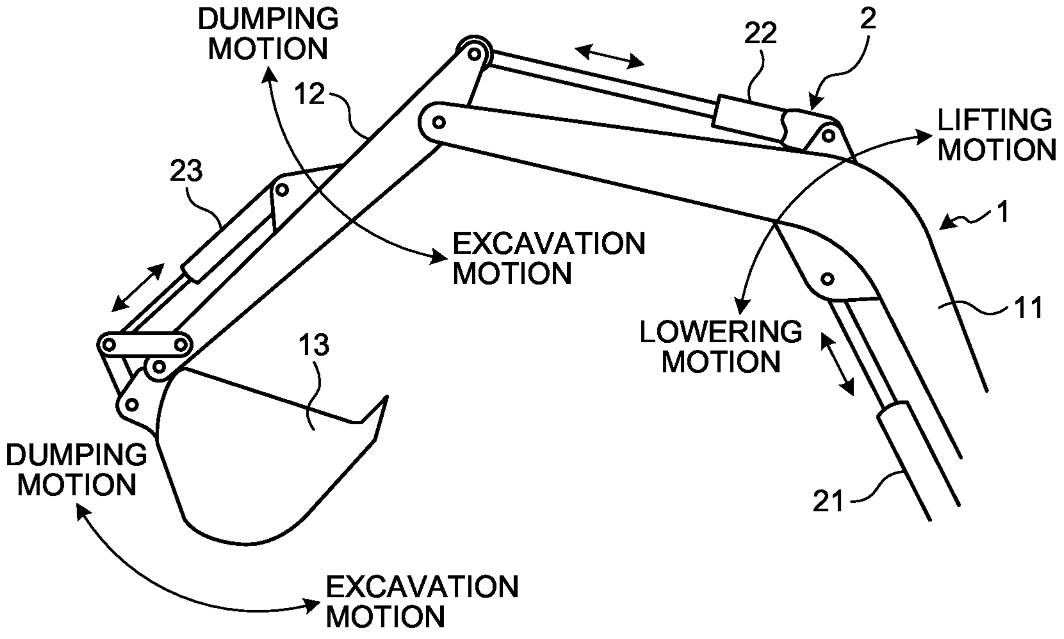
FIG. 2 is a schematic diagram for describing motions of a working equipment according to the embodiment.

FIG. 2 is a schematic diagram for describing motions of the working equipment 1 according to the embodiment. The operation device 5 is operated to move the working equipment 1 and the swing body 3. The hydraulic cylinder 2 or the swing motor (not illustrated) is driven by the operation of the operation device 5. Driving of the hydraulic cylinder 2 causes the working equipment 1 to move. Driving of the swing motor causes the swing body 3 to move. A lifting motion of the boom 11, a lowering motion of the boom 11, an excavation motion of the arm 12, a dumping motion of the arm 12, a dumping motion of the bucket 13, and an excavation motion of the bucket 13 are performed by the operation of the operation device 5. A swing motion of the swing body 3 is performed by the operation of the operation device 5.

Extension of the boom cylinder 21 causes the boom 11 to perform the lifting motion. Retraction of the boom cylinder 21 causes the boom 11 to perform the lowering motion.

Extension of the arm cylinder 22 causes the arm 12 to perform the excavation motion. Retraction of the arm cylinder 22 causes the arm 12 to perform the dumping motion.

Extension of the bucket cylinder 23 causes the bucket 13 to perform the excavation motion. Retraction of the bucket cylinder 23 causes the bucket 13 to perform the dumping motion.

Driving of the swing motor causes the swing body 3 to perform the swing motion.

Control System

Figure 3:
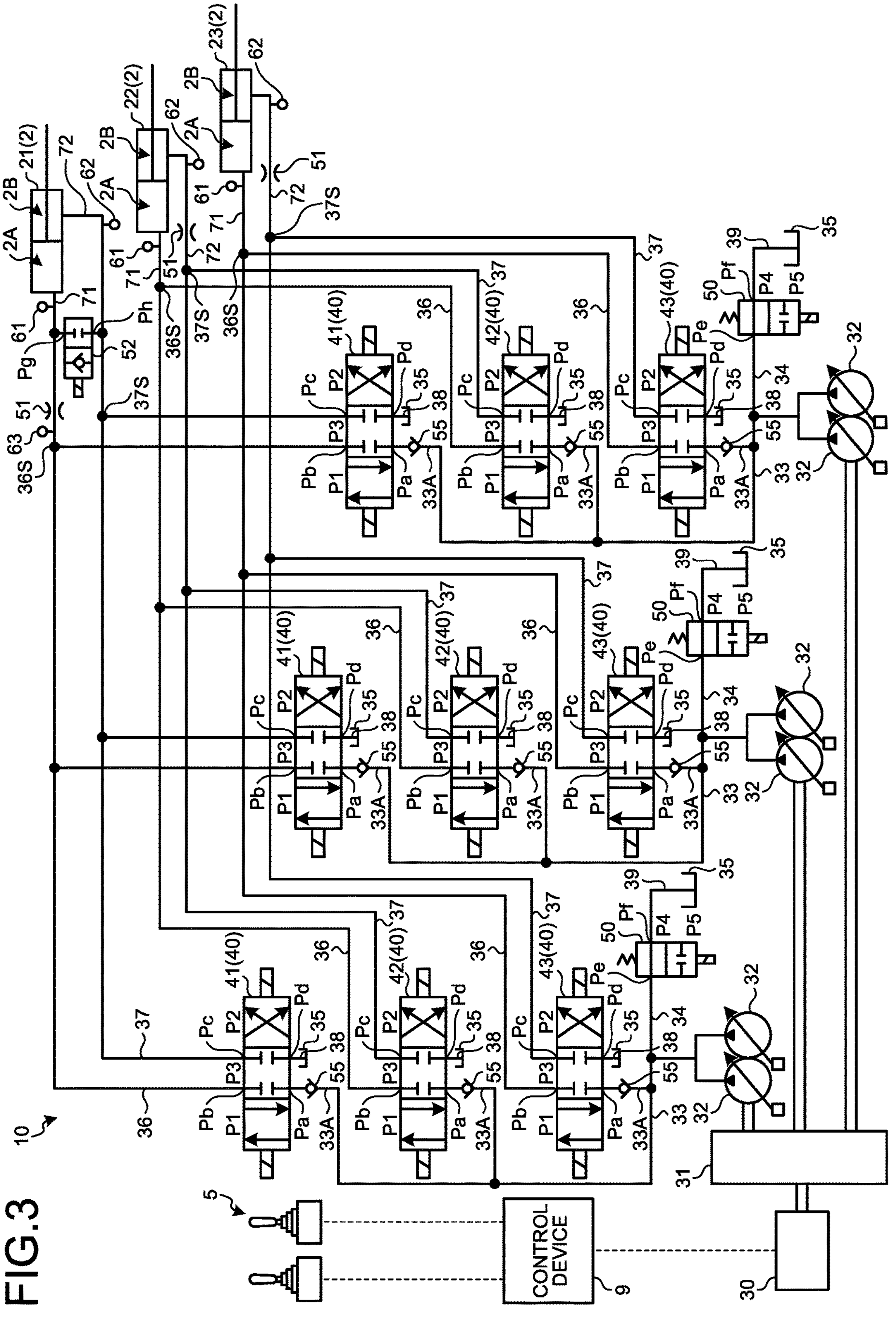
FIG. 3 is a schematic diagram illustrating a control system for the work machine according to the embodiment.

FIG. 3 is a schematic diagram illustrating a control system 10 for the excavator 100 according to the embodiment. As illustrated in FIG. 3, the control system 10 includes a control device 9, an engine 30, a power transmission mechanism 31, a hydraulic pump 32, a first flow path 33, a second flow path 34, a tank 35, the hydraulic cylinder 2, a flow rate control valve 40, a bleed valve 50, a throttle 51, and a regeneration valve 52. Each of the engine 30, the power transmission mechanism 31, the hydraulic pump 32, and the tank 35 is disposed in the machine room 7 of the swing body 3.

The engine 30 is a power source of the excavator 100. A diesel engine is exemplified as the engine 30.

The power transmission mechanism 31 transmits power generated by the engine 30 to the hydraulic pump 32. In the embodiment, a plurality of hydraulic pumps 32 are provided. In the example illustrated in FIG. 3, six hydraulic pumps 32 are provided. The power transmission mechanism 31 distributes the power generated by the engine 30 to the plurality of hydraulic pumps 32.

The hydraulic pump 32 is driven by the power transmitted from the power transmission mechanism 31. The hydraulic pump 32 discharges hydraulic oil. In the embodiment, the hydraulic pump 32 is a variable displacement hydraulic pump.

The hydraulic cylinders 2 move the working equipment elements in a movable range based on the hydraulic oil supplied from the hydraulic pumps 32. As described above, the hydraulic cylinders 2 include the boom cylinder 21 that moves the boom 11, the arm cylinder 22 that moves the arm 12, and the bucket cylinder 23 that moves the bucket 13.

Each hydraulic cylinder 2 includes a bottom chamber 2A and a rod chamber 2B. When the hydraulic oil is supplied to the bottom chamber 2A, the hydraulic cylinder 2 extends. When the hydraulic oil is supplied to the rod chamber 2B, the hydraulic cylinder 2 retracts.

The first flow path 33 is connected to a discharge port of the hydraulic pump 32. In the example illustrated in FIG. 3, the first flow path 33 is connected to each of the discharge ports of two of the hydraulic pumps 32. The hydraulic oil discharged from the discharge port of the hydraulic pump 32 can flow through the first flow path 33. The hydraulic oil discharged from the hydraulic pump 32 and flowing through the first flow path 33 is supplied to the hydraulic cylinder 2.

The second flow path 34 is provided in such a manner as to branch off from the first flow path 33. The hydraulic oil discharged from the discharge port of the hydraulic pump 32 can flow through the second flow path 34. The hydraulic oil discharged from the hydraulic pump 32 and flowing through the second flow path 34 is discharged to the tank 35.

The flow rate control valve 40 adjusts the flow rate of the hydraulic oil supplied to the hydraulic cylinder 2 via the first flow path 33. The bottom chamber 2A of the hydraulic cylinder 2 is connected to the flow rate control valve 40 via a bottom flow path 36 and a collective flow path 71. The rod chamber 2B of the hydraulic cylinder 2 is connected to the flow rate control valve 40 via a collective flow path 72 and a rod flow path 37.

A plurality of flow rate control valves 40 are provided. The flow rate control valves 40 include a boom flow rate control valve 41 that adjusts the flow rate of the hydraulic oil supplied to the boom cylinder 21, an arm flow rate control valve 42 that adjusts the flow rate of the hydraulic oil supplied to the arm cylinder 22, and a bucket flow rate control valve 43 that adjusts the flow rate of the hydraulic oil supplied to the bucket cylinder 23. The hydraulic oil discharged from the hydraulic pump 32 to the first flow path 33 is supplied to the corresponding boom flow rate control valve 41, arm flow rate control valve 42, and bucket flow rate control valve 43.

In the embodiment, a plurality of boom flow rate control valves 41, a plurality of arm flow rate control valves 42, and a plurality of bucket flow rate control valves 43 are provided. In the example illustrated in FIG. 3, three boom flow rate control valves 41 are provided. Three arm flow rate control valves 42 are provided. Three bucket flow rate control valves 43 are provided.

The flow rate control valves 40 are respectively connected to the plurality of hydraulic pumps 32. The three boom flow rate control valves 41 are respectively connected to the plurality of hydraulic pumps 32. The three arm flow rate control valves 42 are respectively connected to the plurality of hydraulic pumps 32. The three bucket flow rate control valves 43 are respectively connected to the plurality of hydraulic pumps 32.

Three collective flow paths 71 are provided so as to be connected to the bottom chamber 2A of the boom cylinder 21, the bottom chamber 2A of the arm cylinder 22, and the bottom chamber 2A of the bucket cylinder 23, respectively.

Three collective flow paths 72 are provided so as to be connected to the rod chamber 2B of the boom cylinder 21, the rod chamber 2B of the arm cylinder 22, and the rod chamber 2B of the bucket cylinder 23, respectively.

Nine bottom flow paths 36 are provided so as to be connected to the three boom flow rate control valves 41, the three arm flow rate control valves 42, and the three bucket flow rate control valves 43, respectively.

The bottom flow paths 36 respectively connected to the three boom flow rate control valves 41 are connected to the collective flow path 71 connected to the bottom chamber 2A of the boom cylinder 21 via a collective part 36S.

The bottom flow paths 36 respectively connected to the three arm flow rate control valves 42 are connected to the collective flow path 71 connected to the bottom chamber 2A of the arm cylinder 22 via a collective part 36S.

The bottom flow paths 36 respectively connected to the three bucket flow rate control valves 43 are connected to the collective flow path 71 connected to the bottom chamber 2A of the bucket cylinder 23 via a collective part 36S.

Nine rod flow paths 37 are provided so as to be connected to the three boom flow rate control valves 41, the three arm flow rate control valves 42, and the three bucket flow rate control valves 43, respectively.

The rod flow paths 37 respectively connected to the three boom flow rate control valves 41 are connected to the collective flow path 72 connected to the rod chamber 2B of the boom cylinder 21 via a collective part 37S.

The rod flow paths 37 respectively connected to the three arm flow rate control valves 42 are connected to the collective flow path 72 connected to the rod chamber 2B of the arm cylinder 22 via a collective part 37S.

The rod flow paths 37 respectively connected to the three bucket flow rate control valves 43 are connected to the collective flow path 72 connected to the rod chamber 2B of the bucket cylinder 23 via a collective part 37S.

That is, the bottom chamber 2A of the boom cylinder 21 is connected to each of the three boom flow rate control valves 41 via the collective flow path 71 and the bottom flow path 36. The rod chamber 2B of the boom cylinder 21 is connected to each of the three boom flow rate control valves 41 via the collective flow path 72 and the rod flow path 37.

The bottom chamber 2A of the arm cylinder 22 is connected to each of the three arm flow rate control valves 42 via the collective flow path 71 and the bottom flow path 36. The rod chamber 2B of the arm cylinder 22 is connected to each of the three arm flow rate control valves 42 via the collective flow path 72 and the rod flow path 37.

The bottom chamber 2A of the bucket cylinder 23 is connected to each of the three bucket flow rate control valves 43 via the collective flow path 71 and the bottom flow path 36. The rod chamber 2B of the bucket cylinder 23 is connected to each of the three bucket flow rate control valves 43 via the collective flow path 72 and the rod flow path 37.

The hydraulic pump 32 can supply hydraulic oil to the corresponding boom flow rate control valve 41, arm flow rate control valve 42, and bucket flow rate control valve 43 via the first flow path 33. A supply flow path 33A is connected to the corresponding boom flow rate control valve 41, arm flow rate control valve 42, and bucket flow rate control valve 43. The first flow path 33 is connected to each of the three supply flow paths 33A. The hydraulic oil discharged from the hydraulic pump 32 to the first flow path 33 is supplied to the corresponding boom flow rate control valve 41, arm flow rate control valve 42, and bucket flow rate control valve 43 via the supply flow path 33A.

The bleed valve 50 adjusts the flow rate of the hydraulic oil discharged to the tank 35 via the second flow path 34. The bleed valve 50 is disposed in the second flow path 34. The hydraulic pump 32 can supply hydraulic oil to the bleed valve 50 via the second flow path 34. The second flow path 34 branches off from the first flow path 33 between the hydraulic pump 32 and the flow rate control valve 40. The hydraulic oil discharged from the hydraulic pump 32 to the second flow path 34 is supplied to the bleed valve 50 without being supplied to the flow rate control valve 40.

The bleed valve 50 has an inflow port Pe and an outflow port Pf.

The inflow port Pe is connected to the hydraulic pump 32 via the second flow path 34. The hydraulic oil discharged from the hydraulic pump 32 can flow into the bleed valve 50 from the inflow port Pe after flowing through the second flow path 34.

The outflow port Pf is connected to the tank 35 via a tank flow path 39. The hydraulic oil flowing out from the outflow port Pf flows through the tank flow path 39 and then is discharged to the tank 35.

A spool of the bleed valve 50 moves between a discharge position P4 for discharging the hydraulic oil to the tank 35 and a stop position P5 for not allowing the hydraulic oil to flow.

When the spool of the bleed valve 50 is disposed at the discharge position P4, the hydraulic oil discharged from the hydraulic pump 32 flows through the second flow path 34, then flows into the bleed valve 50 from the inflow port Pe and flows out from the outflow port Pf. The hydraulic oil flowing out from the outflow port Pf flows through the tank flow path 39 and then is discharged to the tank 35.

When the spool of the bleed valve 50 is disposed at the stop position P5, the hydraulic oil cannot flow through the bleed valve 50.

The bleed valve 50 controls the flow rate of the hydraulic oil discharged to the tank 35 according to a movement amount of the spool. The opening area of the port through which the hydraulic oil flows in the bleed valve 50 is adjusted according to the movement amount of the spool. The flow rate of the hydraulic oil discharged to the tank 35 is adjusted by adjusting the opening area of the bleed valve 50.

The throttle 51 is disposed in the collective flow path 71 or the collective flow path 72. In the embodiment, the throttle 51 is disposed in the collective flow path 71 connected to the bottom chamber 2A of the boom cylinder 21. The throttle 51 may be disposed in the collective flow path 72 connected to the rod chamber 2B of the arm cylinder 22. The throttle 51 may be disposed in the collective flow path 72 connected to the rod chamber 2B of the bucket cylinder 23. The throttle 51 adjusts the flow rate of the hydraulic oil flowing through the collective flow path 71 or the collective flow path 72. The throttle 51 is provided in a collective flow path affected by the self-weight (action of gravity) of the working equipment elements.

The regeneration valve 52 adjusts a regeneration flow rate of the hydraulic oil regenerated from the collective flow path 71 to the collective flow path 72 or a regeneration flow rate of the hydraulic oil regenerated from the collective flow path 72 to the collective flow path 71. In the embodiment, the regeneration valve 52 is disposed so as to adjust the regeneration flow rate of the hydraulic oil regenerated from the collective flow path 71 connected to the bottom chamber 2A of the boom cylinder 21 to the collective flow path 72 connected to the rod chamber 2B of the boom cylinder 21. The regeneration valve 52 may be disposed so as to adjust the regeneration flow rate of the hydraulic oil regenerated from the collective flow path 72 connected to the rod chamber 2B of the arm cylinder 22 to the collective flow path 71 connected to the bottom chamber 2A of the arm cylinder 22.

Figure 4:
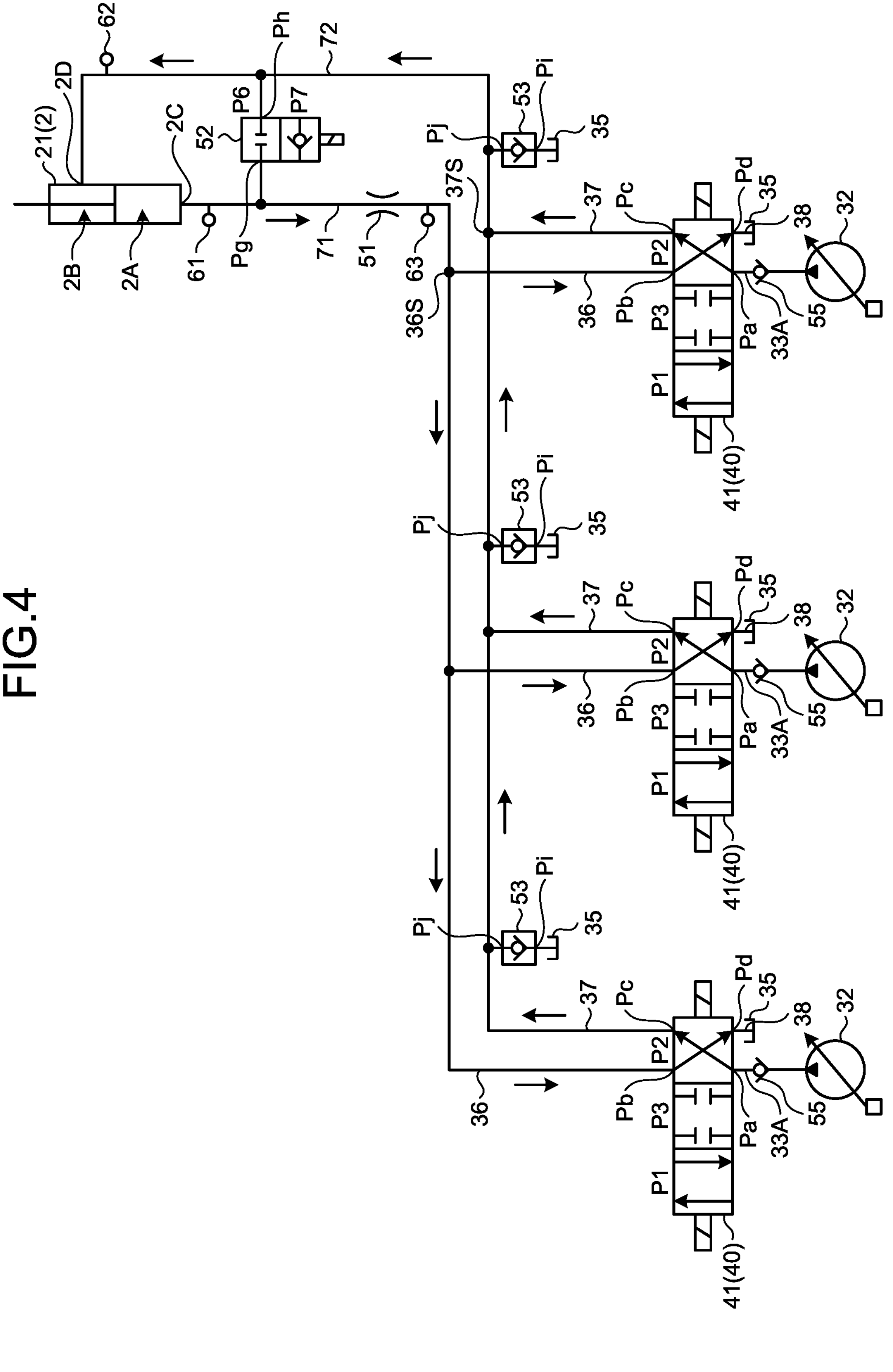
FIG. 4 is a schematic diagram illustrating a control system for the work machine according to the embodiment.

FIG. 4 is a schematic diagram illustrating the control system 10 for the excavator 100 according to the embodiment. FIG. 4 corresponds to a diagram obtained by extracting the boom cylinder 21 and the boom flow rate control valve 41 in FIG. 3. In the example illustrated in FIG. 3, the hydraulic oil from the two hydraulic pumps 32 disposed in tandem is merged and supplied to the plurality of flow rate control valves 40 (41, 42, 43) disposed in parallel, but in the example illustrated in FIG. 4, the number of the hydraulic pumps 32 is one. The number of the hydraulic pumps 32 may take any number. In the example illustrated in FIG. 3, a plurality of hydraulic pumps 32 are connected to the power transmission mechanism 31. The hydraulic oil discharged from the hydraulic pumps 32 disposed in tandem flows through one flow rate control valve 40 and then merges and is supplied to one hydraulic cylinder 2. A plurality of hydraulic circuits through which the hydraulic oil supplied to one hydraulic cylinder 2 flows are provided. In the example illustrated in FIG. 3, the hydraulic oil from the three flow rate control valves 40 (for example, 41, 41, 41) provided in the respective hydraulic circuits is merged and supplied to one hydraulic cylinder 2 (for example, the boom cylinder 21), but the present invention is not limited thereto. The number of flow rate control valves 40 that supply hydraulic oil to one hydraulic cylinder 2 may take any number.

As illustrated in FIG. 4, the control system 10 includes the plurality of hydraulic pumps 32 that discharge hydraulic oil, the hydraulic cylinder 2 that moves a working equipment element, the plurality of flow rate control valves 40 that are respectively connected to the plurality of hydraulic pumps 32 and adjust a flow rate of the hydraulic oil supplied to the hydraulic cylinder 2, the plurality of rod flow paths 37 respectively connected to the plurality of flow rate control valves 40, the collective flow path 72 that connects the collective part 37S of the plurality of rod flow paths 37 and an opening 2D of the rod chamber 2B of the hydraulic cylinder 2, the plurality of bottom flow paths 36 respectively connected to the plurality of flow rate control valves 40, the collective flow path 71 that connects the collective part 36S of the plurality of bottom flow paths 36 and an opening 2C of the bottom chamber 2A of the hydraulic cylinder 2, and the throttle 51 disposed in the collective flow path 71.

The boom 11 performs the lifting motion and the lowering motion with the boom cylinder 21. FIG. 4 illustrates a state in which the boom cylinder 21 is retracting and the boom 11 is performing the lowering motion. When the boom 11 performs the lowering motion, the hydraulic oil flows into the rod chamber 2B of the boom cylinder 21 and flows out from the bottom chamber 2A of the boom cylinder 21. That is, the hydraulic oil discharged from the hydraulic pump 32 flows into the rod flow path 37 via the boom flow rate control valve 41, flows through the collective flow path 72, and then flows into the rod chamber 2B via the opening 2D. The hydraulic oil flowing out from the opening 2C of the bottom chamber 2A of the hydraulic cylinder 2 flows through the collective flow path 71 and the bottom flow path 36, and then is discharged to the tank 35 via the boom flow rate control valve 41.

In the following description, the rod flow path 37 will be appropriately referred to as a supply flow path 37, the opening 2D of the rod chamber 2B will be appropriately referred to as an inlet 2D, the collective flow path 72 will be appropriately referred to as a meter-in flow path 72, the opening 2C of the bottom chamber 2A will be appropriately referred to as an outlet 2C, the collective flow path 71 will be appropriately referred to as a meter-out flow path 71, and the bottom flow path 36 will be appropriately referred to as a discharge flow path 36.

The hydraulic pump 32 discharges hydraulic oil. A plurality of hydraulic pumps 32 are provided. In the example illustrated in FIG. 4, three hydraulic pumps 32 are provided. One hydraulic pump 32 is connected to one boom flow rate control valve 41. As illustrated in FIG. 3, two hydraulic pumps 32 may be connected to one boom flow rate control valve 41.

The boom cylinder 21 moves the boom 11. The boom 11 performs the lifting motion and the lowering motion with the boom cylinder 21. In the lowering motion of the boom 11, the hydraulic oil flows into the rod chamber 2B from the inlet 2D, and the hydraulic oil in the bottom chamber 2A flows out from the outlet 2C.

The boom flow rate control valve 41 adjusts the flow rate of the hydraulic oil supplied to the boom cylinder 21. A plurality of boom flow rate control valves 41 are provided. In the example illustrated in FIG. 4, three boom flow rate control valves 41 are provided. The three boom flow rate control valves 41 are connected to the three hydraulic pumps 32, respectively. The boom flow rate control valve 41 and the hydraulic pump 32 have a one-to-one correspondence.

The supply flow path 37 is connected to the boom flow rate control valve 41. A plurality of supply flow paths 37 are provided. In the example illustrated in FIG. 4, three supply flow paths 37 are provided. The three supply flow paths 37 are connected to the three boom flow rate control valves 41, respectively. The supply flow path 37 and the boom flow rate control valve 41 have a one-to-one correspondence.

One end portions of the supply flow paths 37 are respectively connected to the boom flow rate control valves 41. The other end portions of the supply flow paths 37 are collected at the collective part 37S. The other end portions of the supply flow paths 37 are connected to the meter-in flow path 72 via the collective part 37S. The hydraulic oil flowing through each of the plurality of supply flow paths 37 merges in the meter-in flow path 72.

The meter-in flow path 72 is connected to the inlet 2D into which hydraulic oil flows in the lowering motion of the boom 11. The meter-in flow path 72 connects the collective part 37S of the three supply flow paths 37 and the inlet 2D of the hydraulic oil of the boom cylinder 21. The hydraulic oil flowing through each of the plurality of supply flow paths 37 and merged in the meter-in flow path 72 flows through the meter-in flow path 72 and then flows into the rod chamber 2B from the inlet 2D.

The discharge flow path 36 is connected to the boom flow rate control valve 41. A plurality of discharge flow paths 36 are provided. In the example illustrated in FIG. 4, three discharge flow paths 36 are provided. The three discharge flow paths 36 are connected to the three boom flow rate control valves 41, respectively. The discharge flow path 36 and the boom flow rate control valve 41 have a one-to-one correspondence.

One end portions of the discharge flow paths 36 are respectively connected to the boom flow rate control valves 41. The other end portions of the discharge flow paths 36 are collected at the collective part 36S. The other end portions of the discharge flow paths 36 are connected to the meter-out flow path 71 via the collective part 36S. The hydraulic oil flowing through the meter-out flow path 71 branches into the three discharge flow paths 36.

The meter-out flow path 71 is connected to the outlet 2C through which hydraulic oil flows out in the lowering motion of the boom 11. The meter-out flow path 71 connects the collective part 36S of the three discharge flow paths 36 and the outlet 2C of the hydraulic oil of the boom cylinder 21. The hydraulic oil flowing out from the outlet 2C of the bottom chamber 2A flows through the meter-out flow path 71, then flows through each of the plurality of discharge flow paths 36 and flows into each of the plurality of boom flow rate control valves 41.

The boom flow rate control valve 41 (flow rate control valve 40) has a pump port Pa, a bottom port Pb, a rod port Pc, and a tank port Pd.

The supply flow path 33A is connected to the pump port Pa. The pump port Pa is connected to the hydraulic pump 32 via the supply flow path 33A. The hydraulic oil discharged from the hydraulic pump 32 can flow into the flow rate control valve 40 from the pump port Pa after flowing through the supply flow path 33A.

The supply flow path 37 is connected to the rod port Pc. The rod port Pc is connected to the rod chamber 2B of the hydraulic cylinder 2 via the supply flow path 37 and the meter-in flow path 72. The hydraulic oil flowing out from the rod port Pc can flow into the rod chamber 2B of the hydraulic cylinder 2 after flowing through the rod flow path 37 and the meter-in flow path 72.

The discharge flow path 36 is connected to the bottom port Pb. The bottom port Pb is connected to the bottom chamber 2A of the hydraulic cylinder 2 via the discharge flow path 36 and the meter-out flow path 71. The hydraulic oil flowing out from the bottom chamber 2A of the hydraulic cylinder 2 can flow into the flow rate control valve 40 from the bottom port Pb after flowing through the meter-out flow path 71 and the discharge flow path 36.

The tank port Pd is connected to the tank 35 via a discharge flow path 38. The hydraulic oil flowing out from the tank port Pd flows through the discharge flow path 38 and then is discharged to the tank 35.

The boom flow rate control valve 41 (flow rate control valve 40) is a slide spool type flow rate control valve that switches the flow rate and the direction of the hydraulic oil supplied to the hydraulic cylinder 2 by moving a rod-shaped spool. When the spool moves in the axial direction, the supply of the hydraulic oil to the bottom chamber 2A and the supply of the hydraulic oil to the rod chamber 2B are switched. In addition, the flow rate of the hydraulic oil supplied to the hydraulic cylinder 2 is adjusted based on the movement amount of the spool.

The spool of the boom flow rate control valve 41 moves between a first work position P1 for supplying hydraulic oil to the bottom chamber 2A of the hydraulic cylinder 2, a second work position P2 for supplying hydraulic oil to the rod chamber 2B of the hydraulic cylinder 2, and a stop position P3 that is for not allowing hydraulic oil to flow and disposed between the first work position P1 and the second work position P2. In FIG. 4, the spool of the boom flow rate control valve 41 is disposed at the second work position P2.

When the spool of the boom flow rate control valve 41 is disposed at the first work position P1, the hydraulic oil discharged from the hydraulic pump 32 flows through the supply flow path 33A, then flows into the boom flow rate control valve 41 from the pump port Pa and flows out from the bottom port Pb. The hydraulic oil flowing out from the bottom port Pb flows through the bottom flow path 36 and the collective flow path 71, and then flows into the bottom chamber 2A of the hydraulic cylinder 2. This causes the boom cylinder 21 to extend. When the boom cylinder 21 extends, the hydraulic oil flows out from the rod chamber 2B. The hydraulic oil flowing out from the rod chamber 2B of the boom cylinder 21 flows through the collective flow path 72 and the rod flow path 37, then flows into the boom flow rate control valve 41 from the rod port Pc and flows out from the tank port Pd. The hydraulic oil flowing out from the tank port Pd is discharged to the tank 35 via the discharge flow path 38.

When the spool of the boom flow rate control valve 41 is disposed at the second work position P2, the hydraulic oil discharged from the hydraulic pump 32 flows through the supply flow path 33A, then flows into the boom flow rate control valve 41 from the pump port Pa and flows out from the rod port Pc. The hydraulic oil flowing out from the rod port Pc flows through the rod flow path 37 and the collective flow path 72, and then flows into the rod chamber 2B of the boom cylinder 21. This causes the boom cylinder 21 to retract. When the boom cylinder 21 retracts, the hydraulic oil flows out from the bottom chamber 2A. The hydraulic oil flowing out from the bottom chamber 2A of the boom cylinder 21 flows through the collective flow path 71 and the bottom flow path 36, then flows into the boom flow rate control valve 41 from the bottom port Pb and flows out from the tank port Pd. The hydraulic oil flowing out from the tank port Pd is discharged to the tank 35 via the discharge flow path 38.

When the spool of the boom flow rate control valve 41 is disposed at the stop position P3, the hydraulic oil cannot flow through the boom flow rate control valve 41.

The boom flow rate control valve 41 controls the flow rate of the hydraulic oil supplied to the boom cylinder 21 according to a movement amount of the spool. The opening area of the port through which the hydraulic oil flows in the boom flow rate control valve 41 is adjusted according to the movement amount of the spool. The flow rate of the hydraulic oil supplied to the boom cylinder 21 is adjusted by adjusting the opening area of the boom flow rate control valve 41.

The throttle 51 is disposed in the meter-out flow path 71. The throttle 51 is disposed in the meter-out flow path 71 between the outlet 2C and the collective part 36S. The throttle 51 adjusts the flow rate of the hydraulic oil flowing through the meter-out flow path 71. The opening area of the throttle 51 is smaller than the opening area of the outlet 2C. The opening area of the throttle 51 is smaller than the maximum opening area of the boom flow rate control valve 41. The throttle 51 defines the flow rate of the hydraulic oil flowing through the meter-out flow path 71 in the lowering motion of the boom 11.

The control system 10 also includes the regeneration valve 52 that adjusts the regeneration flow rate of the hydraulic oil regenerated from the meter-out flow path 71 to the meter-in flow path 72. The regeneration valve 52 is disposed in a regeneration flow path connecting an intermediate part of the meter-out flow path 71 and an intermediate part of the meter-in flow path 72.

The regeneration valve 52 has an inflow port Pg and an outflow port Ph.

The inflow port Pg is connected to the meter-out flow path 71. The hydraulic oil flowing out from the outlet 2C can flow into the regeneration valve 52 from the inflow port Pg after flowing through at least a part of the meter-out flow path 71.

The outflow port Ph is connected to the meter-in flow path 72. The hydraulic oil flowing out from the outflow port Ph flows through at least a part of the meter-in flow path 72, and then flows into the rod chamber 2B from the inlet 2D.

In the lowering motion of the boom 11, there is a possibility that the load pressure of the hydraulic oil increases due to the self-weight (action of gravity) of the boom 11. The moving speed of the boom 11 can be increased by returning a part of the hydraulic oil flowing out from the bottom chamber 2A to the rod chamber 2B using the load pressure due to the self-weight of the boom 11.

A spool of the regeneration valve 52 moves between a stop position P6 for not allowing hydraulic oil to flow and a regeneration position P7 for regenerating hydraulic oil.

When the spool of the regeneration valve 52 is disposed at the stop position P6, the hydraulic oil cannot flow through the regeneration valve 52.

When the spool of the regeneration valve 52 is disposed at the regeneration position P7, at least a part of the hydraulic oil in the meter-out flow path 71 can flow into the meter-in flow path 72 via the regeneration valve 52.

The regeneration valve 52 controls a regeneration flow rate indicating the flow rate of the hydraulic oil supplied from the meter-out flow path 71 to the meter-in flow path 72 according to a movement amount of the spool. The opening area of the port through which the hydraulic oil flows in the regeneration valve 52 is adjusted according to the movement amount of the spool. The regeneration flow rate is adjusted by adjusting the opening area of the regeneration valve 52.

The control system 10 also includes a suction valve 53 disposed between the supply flow path 37 and the tank 35. The suction valve 53 causes hydraulic oil to flow from the tank 35 to the supply flow path 37 when a pressure difference between the supply flow path 37 and the tank 35 becomes equal to or more than a predetermined specified value. An inflow port Pi of the suction valve 53 is connected to the tank 35. An outflow port Pj of the suction valve 53 is connected to the supply flow path 37.

The cylinder speed of the boom cylinder 21 is determined based on an operation amount of the operation device 5. The cylinder speed increases as the operation amount of the operation device 5 increases, and the cylinder speed decreases as the operation amount of the operation device 5 decreases. In the lowering motion of the boom 11, there is a possibility that the cylinder speed of the boom cylinder 21 becomes higher than the cylinder speed specified based on the operation amount of the operation device 5 due to the self-weight (action of gravity) of the boom 11. That is, in the lowering motion of the boom 11, the boom cylinder 21 may rapidly retract. When the boom cylinder 21 rapidly retracts due to the self-weight of the boom 11, even with the hydraulic oil being discharged from the hydraulic pump 32, the flow rate of the hydraulic oil supplied to the rod chamber 2B of the boom cylinder 21 is insufficient, and the pressure of the supply flow path 37 and the meter-in flow path 72 may rapidly decrease. When the hydraulic oil supplied from the hydraulic pump 32 is insufficient, a cavitation phenomenon in which bubbles are generated in the hydraulic oil may occur. By providing the suction valve 53, when the pressure of the supply flow path 37 and the meter-in flow path 72 rapidly decreases and the pressure difference between the supply flow path 37 and the tank 35 becomes equal to or more than a specified value, an opening of the suction valve 53 opens, and the hydraulic oil is supplied from the tank 35 to the supply flow path 37 via the suction valve 53. As a result, hydraulic oil is supplied to the supply flow path 37 from both the hydraulic pump 32 and the suction valve 53. Therefore, the shortage of the hydraulic oil is suppressed, and the occurrence of a cavitation phenomenon is suppressed.

The control system 10 also includes a pressure sensor 61 that detects the pressure of the hydraulic oil discharged from the boom cylinder 21, a pressure sensor 62 that detects the pressure of the hydraulic oil flowing into the boom cylinder 21, and a pressure sensor 63 that detects the pressure of the hydraulic oil after passing through the throttle 51.

The pressure sensor 61 detects the pressure of the hydraulic oil flowing through the meter-out flow path 71. The pressure sensor 61 detects the pressure of the hydraulic oil in the meter-out flow path 71 between the outlet 2C and the throttle 51. In the embodiment, the pressure sensor 61 detects the pressure of the hydraulic oil in the meter-out flow path 71 between the outlet 2C and the inflow port Pg of the regeneration valve 52.

The pressure sensor 62 detects the pressure of the hydraulic oil flowing through the meter-in flow path 72. The pressure sensor 62 detects the pressure of the hydraulic oil between the outflow port Ph of the regeneration valve 52 and the inlet 2D.

The pressure sensor 63 detects the pressure of the hydraulic oil flowing through the meter-out flow path 71. The pressure sensor 63 detects the pressure of the hydraulic oil in the meter-out flow path 71 between the throttle 51 and the collective part 36S.

Control Device

Figure 5:
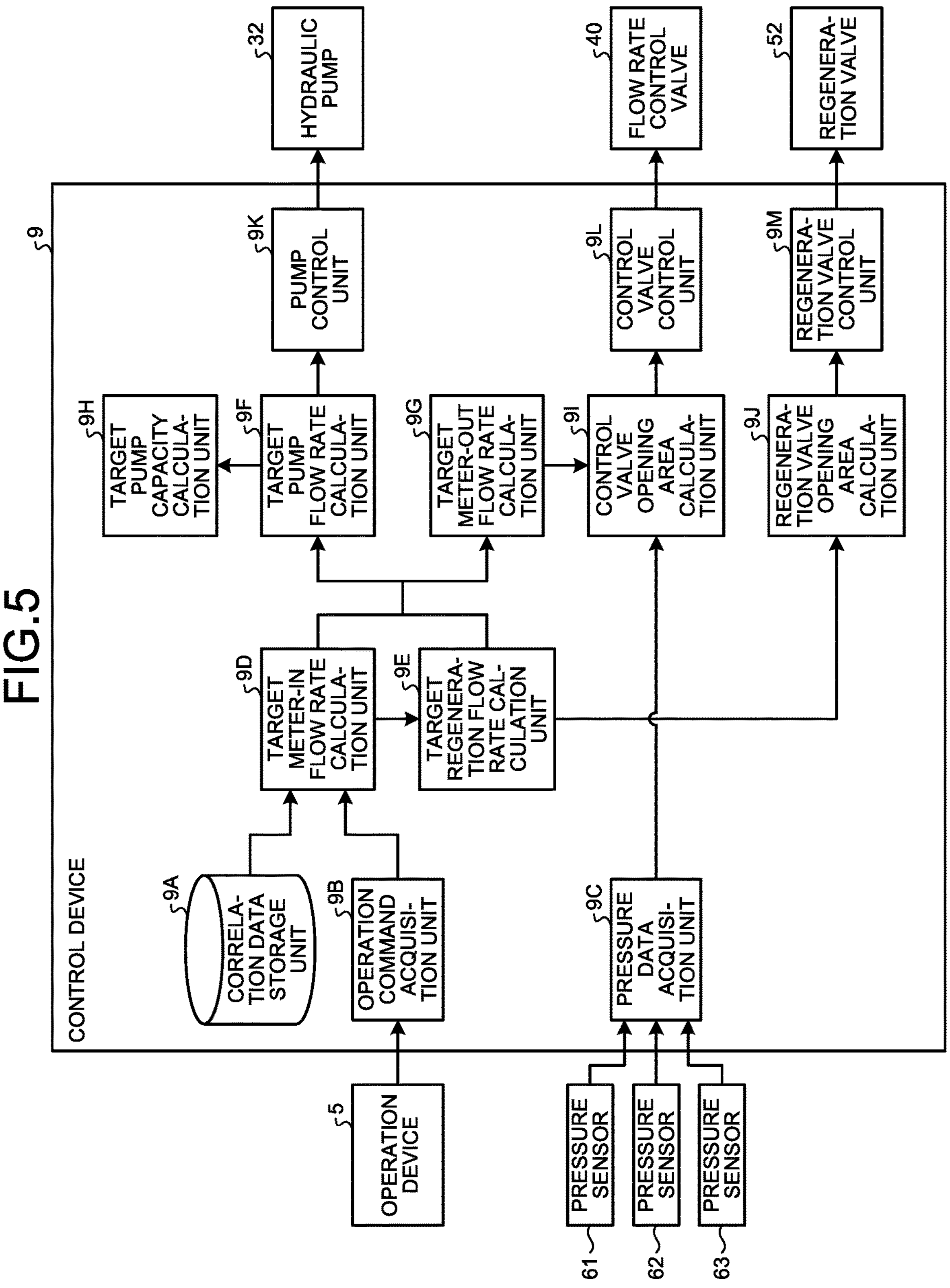
FIG. 5 is a functional block diagram illustrating a control device according to the embodiment.

FIG. 5 is a functional block diagram illustrating the control device 9 according to the embodiment. The control device 9 includes a computer system. The control device 9 is connected to each of the operation device 5, the pressure sensor 61, the pressure sensor 62, and the pressure sensor 63 via a communication line. The control device 9 is connected to each of the hydraulic pump 32, the flow rate control valve 40, and the regeneration valve 52 via a control line.

The control device 9 includes a correlation data storage unit 9A, an operation command acquisition unit 9B, a pressure data acquisition unit 9C, a target meter-in flow rate calculation unit 9D, a target regeneration flow rate calculation unit 9E, a target pump flow rate calculation unit 9F, a target meter-out flow rate calculation unit 9G, a target pump capacity calculation unit 9H, a control valve opening area calculation unit 9I, a regeneration valve opening area calculation unit 9J, a pump control unit 9K, a control valve control unit 9L, and a regeneration valve control unit 9M.

The correlation data storage unit 9A stores correlation data between an operation amount of the operation device 5 and a target meter-in flow rate indicating a target flow rate of the hydraulic oil flowing into the inlet 2D of the hydraulic cylinder 2.

The operation command acquisition unit 9B acquires an operation command of the operation device 5. The operation command of the operation device 5 includes an operation amount of the operation device 5. The operation amount of the operation device 5 includes a tilt angle of the operation levers. When the operation amount of the operation device 5 indicates the maximum value, the operation amount is 100 [%]. When the operation device 5 is not operated, the operation amount is 0 [%].

Figure 6:
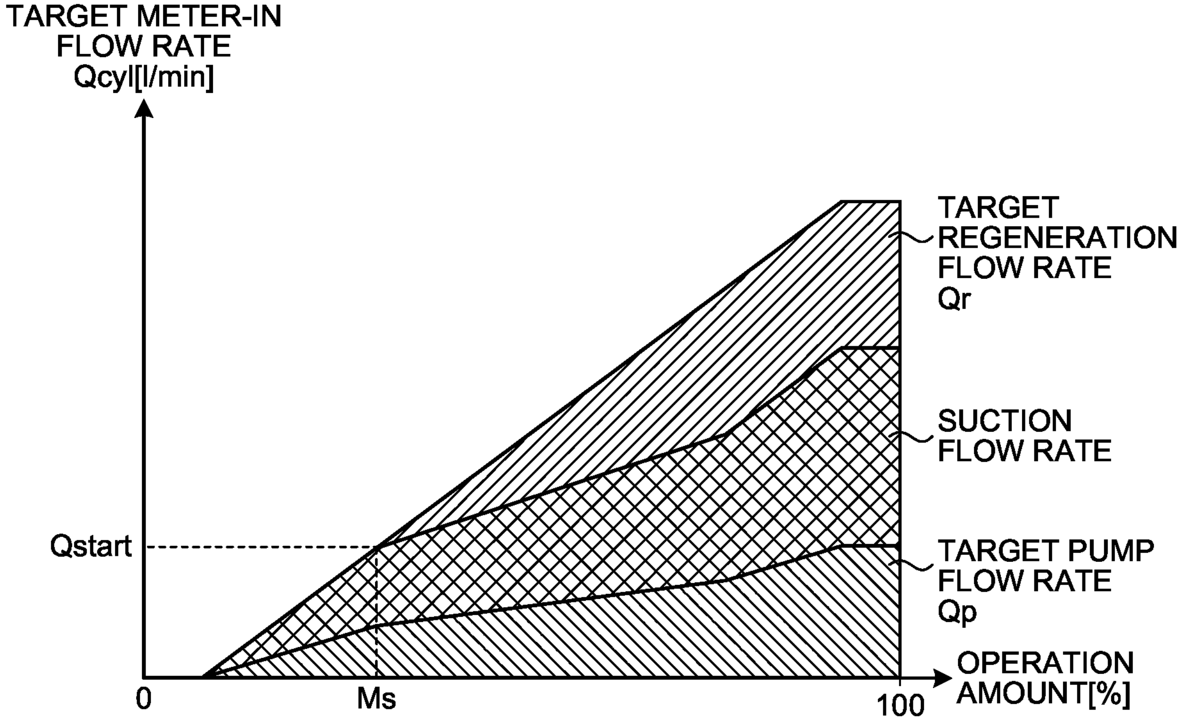
FIG. 6 is a diagram for describing correlation data according to the embodiment.

FIG. 6 is a diagram for describing correlation data according to the embodiment. As illustrated in FIG. 6, correlation data indicating the relationship between the operation amount of the operation device 5 and a target meter-in flow rate Qcyl flowing into the inlet 2D of the flow rate control valve 40 is determined in advance. The correlation data is stored in the correlation data storage unit 9A.

As illustrated in FIG. 6, the correlation data is determined such that the target meter-in flow rate Qcyl decreases as the operation amount of the operation device 5 decreases, and the target meter-in flow rate Qcyl increases as the operation amount of the operation device 5 increases.

In the embodiment, the target meter-in flow rate Qcyl is defined by a target pump flow rate Qp, a suction flow rate, and a target regeneration flow rate Qr. The target pump flow rate Qp indicates a target flow rate of the hydraulic oil discharged from the hydraulic pump 32. The suction flow rate is a flow rate of the hydraulic oil sucked into the supply flow path 37 from the tank 35 via the suction valve 53. The target regeneration flow rate Qr indicates a target flow rate of the hydraulic oil regenerated from the meter-out flow path 71 to the meter-in flow path 72 via the regeneration valve 52.

When the operation amount of the operation device 5 is less than a predetermined value Ms, the target meter-in flow rate Qcyl is defined by the sum of the target pump flow rate Qp and the suction flow rate. When the operation amount of the operation device 5 is equal to or more than the value Ms, the target meter-in flow rate Qcyl is defined by the sum of the target pump flow rate Qp, the suction flow rate, and the target regeneration flow rate Qr.

The correlation data is determined such that the target pump flow rate Qp decreases as the operation amount of the operation device 5 decreases, and the target pump flow rate Qp increases as the operation amount of the operation device 5 increases.

When the operation amount of the operation device 5 is equal to or more than the value Ms, the correlation data is determined such that the target regeneration flow rate Qr decreases as the operation amount of the operation device 5 decreases, and the target regeneration flow rate Qr increases as the operation amount of the operation device 5 increases.

The pressure data acquisition unit 9C acquires detection data of the pressure sensor 61, detection data of the pressure sensor 62, and detection data of the pressure sensor 63. The pressure sensor 61 detects the pressure of the hydraulic oil flowing out from the outlet 2C of the boom cylinder 21. In the embodiment, the pressure sensor 61 detects the pressure of the hydraulic oil in the meter-out flow path 71 between the outlet 2C and the inflow port Pg of the regeneration valve 52. The pressure sensor 62 detects the pressure of the hydraulic oil flowing into the inlet 2D of the hydraulic cylinder 2. In the embodiment, the pressure sensor 62 detects the pressure of the hydraulic oil between the outflow port Ph of the regeneration valve 52 and the inlet 2D. The pressure sensor 63 detects the pressure of the hydraulic oil flowing through the meter-out flow path 71. In the embodiment, the pressure sensor 63 detects the pressure of the hydraulic oil in the meter-out flow path 71 between the throttle 51 and the collective part 36S. The pressure data acquisition unit 9C acquires each of the detection data of the pressure sensor 61, the detection data of the pressure sensor 62, and the detection data of the pressure sensor 63.

The target meter-in flow rate calculation unit 9D calculates the target meter-in flow rate Qcyl [l/min.] based on the correlation data stored in the correlation data storage unit 9A and the operation command (operation amount) of the operation device 5 acquired by the operation command acquisition unit 9B.

The target regeneration flow rate calculation unit 9E calculates the target regeneration flow rate Qr [l/min.] of hydraulic oil based on the target meter-in flow rate Qcyl calculated by the target meter-in flow rate calculation unit 9D. The target regeneration flow rate calculation unit 9E calculates the target regeneration flow rate Qr based on Equation (1).

$$Qr=(\mathrm{Qcyl}-\mathrm{Qstart})\times Kr \quad (1)$$

In Equation (1), Qstart is a regeneration start flow rate and is a threshold value related to the target meter-in flow rate Qcyl. As illustrated in FIG. 6, the regeneration start flow rate Qstart corresponds to the target meter-in flow rate Qcyl when the operation amount of the operation device 5 is the value Ms. The value Ms and the regeneration start flow rate Qstart are freely determined. Kr represents a regeneration flow rate ratio. The regeneration flow rate ratio Kr is a unique value related to the regeneration valve 52 and is known data.

The target pump flow rate calculation unit 9F calculates the target pump flow rate Qp [l/min.] based on the target meter-in flow rate Qcyl calculated by the target meter-in flow rate calculation unit 9D and the target regeneration flow rate Qr calculated by the target regeneration flow rate calculation unit 9E. The target pump flow rate calculation unit 9F calculates the target pump flow rate Qp based on Equation (2).

$$Qp=(\mathrm{Qcyl}-Qr)(1-Ks) \quad (2)$$

In Equation (2), Ks represents a suction valve flow rate ratio. The suction valve flow rate ratio Kw is a unique value related to the suction valve 53 and is known data.

The target meter-out flow rate calculation unit 9G calculates a target meter-out flow rate Qo [l/min.] indicating a target flow rate of the hydraulic oil flowing out from the outlet 2C of the hydraulic cylinder 2 based on the correlation data stored in the correlation data storage unit 9A and the operation command (operation amount) of the operation device 5 acquired by the operation command acquisition unit 9B. The target meter-out flow rate calculation unit 9G calculates the target meter-out flow rate Qo based on Equation (3).

$$Qo=\mathrm{Qcyl}\times(Ao/Ai)-Qr \quad (3)$$

In Equation (3), Ao/Ai represents a pressure receiving area ratio of the hydraulic cylinder 2. The pressure receiving area ratio Ao/Ai is a unique value related to the hydraulic cylinder 2 and is known data.

The target pump capacity calculation unit 9H calculates a target capacity q [cc/rev] of the hydraulic pump 32 based on the target pump flow rate Qp calculated by the target pump flow rate calculation unit 9F. The target pump capacity calculation unit 9H calculates the target capacity q of the hydraulic pump 32 based on Equation (4).

$$q = \frac{Qp \times 1000}{Ne \times h} \tag{4}$$

In Equation (4), Ne is a speed [rpm] of the engine 30, and h is a gear ratio of the power transmission mechanism 31.

The control valve opening area calculation unit 9I calculates a target opening area of the flow rate control valve 40 based on the target meter-out flow rate Qo calculated by the target meter-out flow rate calculation unit 9G. In the embodiment, the control valve opening area calculation unit 9I calculates a target opening area Ao of the flow rate control valve 40 based on the target meter-out flow rate Qo calculated by the target meter-out flow rate calculation unit 9G, an opening area As of the throttle 51, a pressure Po of the hydraulic oil flowing out from the hydraulic cylinder 2, a pressure Pa of the hydraulic oil between the throttle 51 and the flow rate control valve 40, and a pressure Pt of the tank 35.

When the flow rate coefficient of a throttle valve is Cs, the opening area of the throttle 51 is As, the pressure of the hydraulic oil flowing out from the hydraulic cylinder 2 is Po, and the pressure of the hydraulic oil between the throttle 51 and the flow rate control valve 40 is Pa, the target meter-out flow rate Qo can be expressed by Equation (5).

$$Qo = CsAs\sqrt{Po - Pa} \tag{5}$$

When the flow rate coefficient of the flow rate control valve 40 is Co, the target opening area of the flow rate control valve 40 is Ao, the pressure of the hydraulic oil between the throttle 51 and the flow rate control valve 40 is Pa, and the pressure of the hydraulic oil in the tank 35 is Pt, the target meter-out flow rate Qo can be expressed by Equation (6).

$$Qo = CsAs\sqrt{Pa - Pt} \tag{6}$$

The pressure Po is detected by the pressure sensor 61 and acquired by the pressure data acquisition unit 9C. The pressure Pa is detected by the pressure sensor 63 and acquired by the pressure data acquisition unit 9C. The pressure Pt can be regarded as atmospheric pressure. The flow rate coefficient Cs is a unique value related to the throttle 51 and is known data. The flow rate coefficient Co is a unique value related to the flow rate control valve 40 and is known data.

Equation (7) is derived by deleting Pa from Equations (5) and (6). The control valve opening area calculation unit 9I calculates the target opening area Ao of the flow rate control valve 40 based on Equation (7).

$$Ao = \frac{QoCsAs}{Co\sqrt{(CsAs)^2(Po - Pt) - Qo^2}} \tag{7}$$

The target opening area Ao indicates a total target opening area of the three flow rate control valves 40. When the target opening area of each of the three flow rate control valves 40 is Ao[i], the control valve opening area calculation unit 9I calculates the target opening area Ao[i] of each of the flow rate control valves 40 based on Equation (8).

$$Ao[i] = \frac{Qo[i]}{Qo} \times Ao \tag{8}$$

In Equation (8), Qo[i] is the target meter-out flow rate of the flow rate control valve 40[*i*]. In the embodiment, three flow rate control valves 40[1], 40[2], and 40[3] are provided for one hydraulic cylinder 2. Qo[1] is a target meter-out flow rate of the first flow rate control valve 40[1]. Qo[2] is a target meter-out flow rate of the second flow rate control valve 40[2]. Qo[3] is a target meter-out flow rate of the third flow rate control valve 40[3].

The regeneration valve opening area calculation unit 9J calculates a target opening area Ar of the regeneration valve 52 based on the target regeneration flow rate Qr calculated by the target regeneration flow rate calculation unit 9E, a pressure Pi of the hydraulic oil flowing into the inlet 2D, and the pressure Po of the hydraulic oil flowing out from the outlet 2C. The regeneration valve opening area calculation unit 9J calculates the target opening area Ar of the regeneration valve 52 based on Equation (9).

$$Ar = \frac{Qr}{Cr\sqrt{Po - Pi}} \tag{9}$$

In Equation (9), Pi is the pressure of the hydraulic oil flowing into the hydraulic cylinder 2. The pressure Pi is detected by the pressure sensor 62 and acquired by the pressure data acquisition unit 9C. Cr is a flow rate coefficient of the regeneration valve 52. The flow rate coefficient Cr is a unique value related to the regeneration valve 52 and is known data.

The pump control unit 9K outputs a control command for controlling the hydraulic pump 32 so that the capacity of the hydraulic pump 32 becomes the target capacity q calculated by the target pump capacity calculation unit 9H. The hydraulic pump 32 has a swash plate that changes the capacity. The pump control unit 9K outputs a control command for controlling the angle of the swash plate so that the target capacity q is achieved.

The control valve control unit 9L outputs a control command for controlling the flow rate control valve 40 so that the flow rate control valve 40 has the target opening area Ao of the flow rate control valve 40 calculated by the control valve opening area calculation unit 9I. The opening area of the flow rate control valve 40 is adjusted according to the movement amount of the spool. The control valve control unit 9L outputs a control command to an electromagnetic proportional control valve that adjusts the movement amount of the spool so that the target opening area Ao is achieved.

The regeneration valve control unit 9M outputs a control command for controlling the regeneration valve 52 so that the regeneration valve 52 has the target opening area Ar of the regeneration valve 52 calculated by the regeneration valve opening area calculation unit 9J.

Work Machine Control Method

Figure 7:
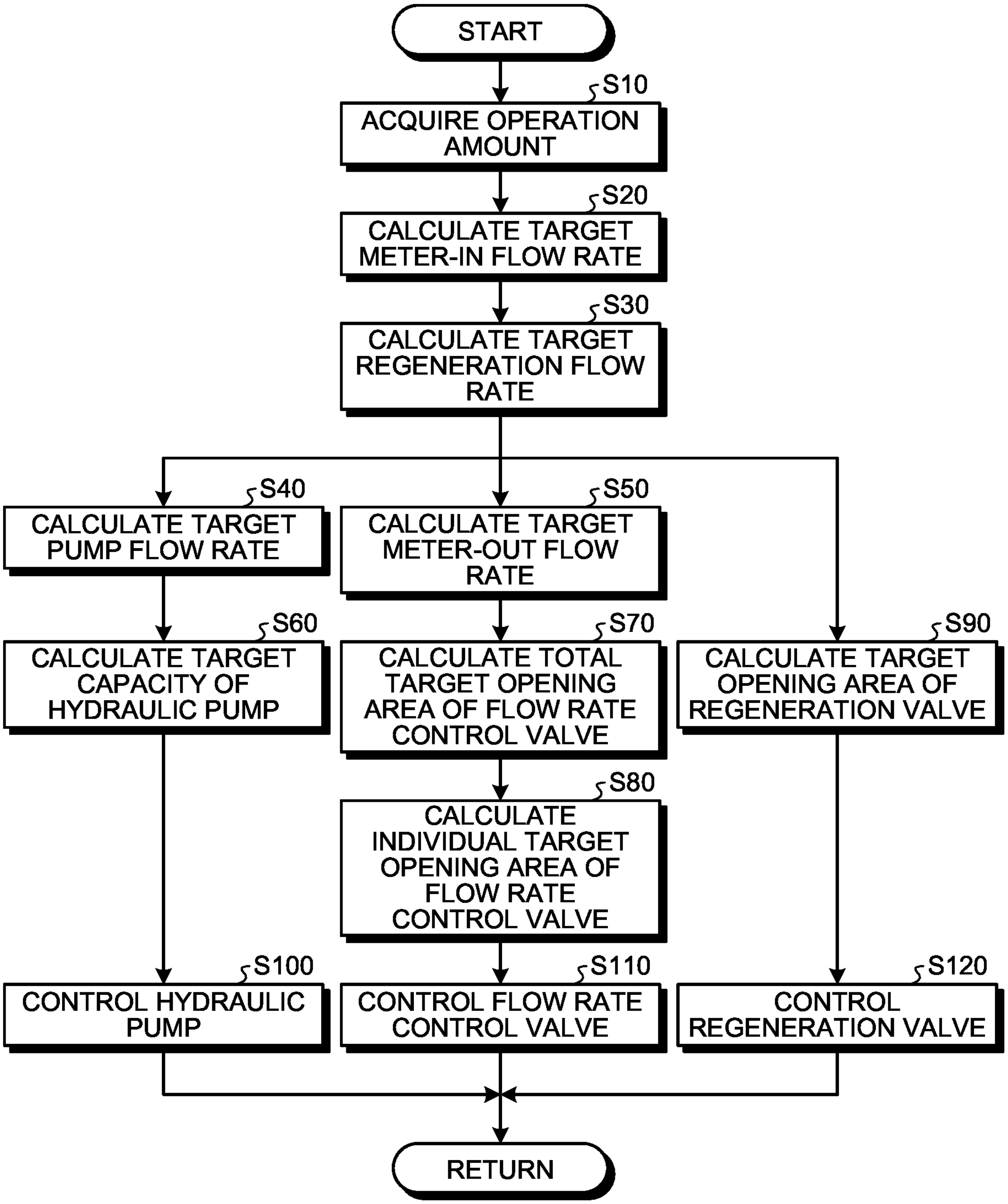
FIG. 7 is a flowchart illustrating a control method for an excavator according to the embodiment.

FIG. 7 is a flowchart illustrating a control method for the excavator 100 according to the embodiment. In the description with reference to FIG. 7, control methods for the boom 11 and the boom cylinder 21 will be mainly described.

The operator operates the operation device 5 to drive the boom cylinder 21. The boom cylinder 21 moves the boom 11 in a movable range.

The operation device 5 outputs an operation command by being operated by the operator. The operation command includes an operation amount of the operation device 5. The operation command acquisition unit 9B acquires the operation amount of the operation device 5 (Step S10).

The target meter-in flow rate calculation unit 9D calculates the target meter-in flow rate Qcyl based on the correlation data stored in the correlation data storage unit 9A and the operation amount of the operation device 5 acquired by the operation command acquisition unit 9B (Step S20).

As illustrated in FIG. 6, the correlation data storage unit 9A stores correlation data indicating the relationship between the operation amount of the operation device 5 and the target meter-in flow rate Qcyl. The correlation data is set in advance. As illustrated in FIG. 6, the correlation data is determined such that the target meter-in flow rate Qcyl increases as the operation amount of the operation device 5 increases.

The target regeneration flow rate calculation unit 9E calculates the target regeneration flow rate Qr based on the target meter-in flow rate Qcyl. The target regeneration flow rate calculation unit 9E calculates the target regeneration flow rate Qr based on the above-described Equation (1) (Step S30).

The regeneration valve 52 is controlled to close when the target meter-in flow rate Qcyl is less than the regeneration start flow rate Qstart and open when the target meter-in flow rate Qcyl is equal to or more than the regeneration start flow rate Qstart. That is, in FIG. 6, the opening of the regeneration valve 52 closes when the operation amount of the operation device 5 is from 0 [%] to Ms [%]. The regeneration valve 52 opens when the operation amount of the operation device 5 becomes equal to or more than Ms [%] and the target meter-in flow rate Qcyl becomes equal to or more than the regeneration start flow rate Qstart.

The target pump flow rate calculation unit 9F calculates the target pump flow rate Qp based on the target meter-in flow rate Qcyl and the target regeneration flow rate Qr. The target pump flow rate calculation unit 9F calculates the target pump flow rate Qp based on the above-described Equation (2) (Step S40).

The target meter-out flow rate calculation unit 9G calculates the target meter-out flow rate Qo based on the target meter-in flow rate Qcyl and the target regeneration flow rate Qr. The target meter-out flow rate calculation unit 9G calculates the target meter-out flow rate Qo based on the above-described Equation (3) (Step S50).

The target pump capacity calculation unit 9H calculates the target capacity q [cc/rev] of the hydraulic pump 32 based on the target pump flow rate Qp. The target pump capacity calculation unit 9H calculates the target capacity q of the hydraulic pump 32 based on the above-described Equation (4) (Step S60).

The control valve opening area calculation unit 9I calculates the target opening area Ao of the boom flow rate control valve 41 based on the target meter-out flow rate Qo, the opening area As of the throttle valve, the pressure Po of the hydraulic oil flowing out from the hydraulic cylinder 2, the pressure Pa of the hydraulic oil between the throttle valve and the flow rate control valve 40, and the pressure Pt of the tank 35. The control valve opening area calculation unit 9I calculates the target opening area Ao of the boom flow rate control valve 41 based on the above-described Equations (5), (6), and (7) (Step S70).

The target opening area Ao indicates a total target opening area of the three boom flow rate control valves 41. When the target opening area of each of the three boom flow rate control valves 41 is Ao[i], the control valve opening area calculation unit 9I calculates the target opening area Ao[i] of each of the three boom flow rate control valves 41 based on the above-described Equation (8) (Step S80).

The regeneration valve opening area calculation unit 9J calculates the target opening area Ar of the regeneration valve 52 based on the target regeneration flow rate Qr. The regeneration valve opening area calculation unit 9J calculates the target opening area Ar of the regeneration valve 52 based on the above-described Equation (9) (Step S90).

The pump control unit 9K outputs a control command for controlling the hydraulic pump 32 so that the hydraulic pump 32 has the target capacity q calculated in Step S60. The hydraulic pump 32 has a swash plate that changes the capacity. The pump control unit 9K outputs a control command for controlling the angle of the swash plate so that the target capacity q is achieved (Step S100).

The control valve control unit 9L outputs a control command for controlling the boom flow rate control valve 41[*i*] so that each of the plurality of boom flow rate control valves 41[*i*] has the target opening area Ao[i] calculated in Step S80. The opening area of the boom flow rate control valve 41 is adjusted according to the movement amount of the spool. The control valve control unit 9L outputs a control command to the electromagnetic proportional control valve that adjusts the movement amount of the spool so that the target opening area Ao[i] is achieved (Step S110).

The regeneration valve control unit 9M outputs a control command for controlling the regeneration valve 52 so that the regeneration valve 52 has the target opening area Ar calculated in Step S90 (Step S120).

[Distribution of Hydraulic Oil to A Plurality of Hydraulic Cylinders]

As illustrated in FIG. 3, the hydraulic oil discharged from the hydraulic pump 32 is distributed to each of the boom flow rate control valves 41, the arm flow rate control valves 42, and the bucket flow rate control valves 43 via the first flow path 33. Hereinafter, distribution of hydraulic oil to the plurality of hydraulic cylinders 2 will be described.

Figure 8:
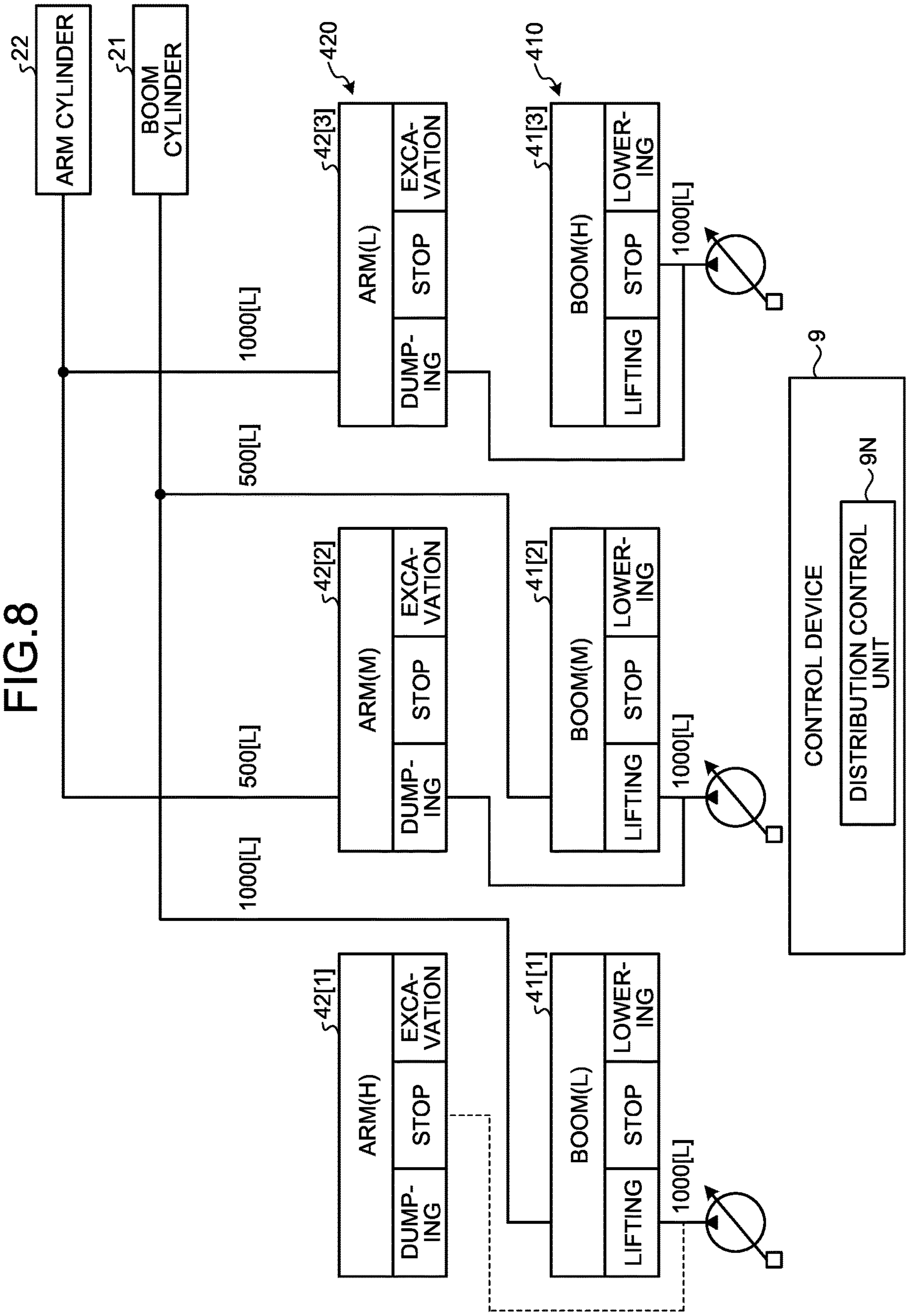
FIG. 8 is a schematic diagram illustrating a control system for the work machine according to the embodiment.

FIG. 8 is a schematic diagram illustrating the control system 10 for the excavator 100 according to the embodiment. FIG. 8 corresponds to a diagram obtained by extracting the boom cylinder 21, the arm cylinder 22, the boom flow rate control valve 41, and the arm flow rate control valve 42 in FIG. 3.

The working equipment elements include the boom 11 and the arm 12. The hydraulic cylinders 2 include the boom cylinder 21 that moves the boom 11 and the arm cylinder 22 that moves the arm 12.

The flow rate control valve 40 includes first-group flow rate control valves 410 including a plurality of (three) boom flow rate control valves 41 with predetermined priority, and second-group flow rate control valves 420 including a plurality of (three) arm flow rate control valves 42 with predetermined priority. The first-group flow rate control valves 410 adjust the flow rate of the hydraulic oil supplied to the boom cylinder 21. The second-group flow rate control valves 420 adjust the flow rate of the hydraulic oil supplied to the arm cylinder 22. The priority is defined in advance which hydraulic cylinder 2 is preferentially supplied with the hydraulic oil in each flow rate control valve 40. Although the priority is defined in the present embodiment, the hydraulic oil may be uniformly supplied from each flow rate control valve 40 without defining the priority.

The first-group flow rate control valves 410 include a boom flow rate control valve 41[1], a boom flow rate control valve 41[2], and a boom flow rate control valve 41[3]. In the first-group flow rate control valves 410, the priority of the boom flow rate control valve 41[1] is the highest, the priority of the boom flow rate control valve 41[2] is the second highest after the boom flow rate control valve 41[1], and the priority of the boom flow rate control valve 41[3] is the lowest.

The second-group flow rate control valves 420 include an arm flow rate control valve 42[1], an arm flow rate control valve 42[2], and an arm flow rate control valve 42[3]. In the second-group flow rate control valves 420, the priority of the arm flow rate control valve 42[3] is the highest, the priority of the arm flow rate control valve 42[2] is the second highest after the arm flow rate control valve 42[1], and the priority of the arm flow rate control valve 42[1] is the lowest.

The control device 9 includes a distribution control unit 9N that controls the opening area of the first-group flow rate control valves 410 based on the priority of the first-group flow rate control valves 410 and the required flow rate of the hydraulic oil in the boom cylinder 21.

In the example illustrated in FIG. 8, the required flow rate of the hydraulic oil in the boom cylinder 21 is 1500 [L] per minute, the required flow rate of the hydraulic oil in the arm cylinder 22 is 1500 [L] per minute, and 1000 [L] of the hydraulic oil is discharged per minute from each of the three hydraulic pumps 32.

The distribution control unit 9N outputs a control command for adjusting the opening area of the first-group flow rate control valves 410 such that 1000 [L] of hydraulic oil is supplied from the boom flow rate control valve 41[1] to the boom cylinder 21 per minute, 500 [L] of hydraulic oil is supplied from the boom flow rate control valve 41[2] to the boom cylinder 21 per minute, and no hydraulic oil is supplied from the boom flow rate control valve 41[3] to the boom cylinder 21 in the first-group flow rate control valves 410. That is, the distribution control unit 9N outputs a control command for adjusting the opening area of the first-group flow rate control valves 410 such that the higher the priority in the first-group flow rate control valves 410, the higher the flow rate of the hydraulic oil supplied from the boom flow rate control valve 41[*i*] to the boom cylinder 21, and the lower the priority, the lower the flow rate of the hydraulic oil supplied from the boom flow rate control valve 41[*i*] to the boom cylinder 21.

In addition, the distribution control unit 9N outputs a control command for adjusting the opening area of the second-group flow rate control valves 420 such that 1000 [L] of hydraulic oil is supplied from the arm flow rate control valve 42[3] to the arm cylinder 22 per minute, 500 [L] of hydraulic oil is supplied from the arm flow rate control valve 42[2] to the arm cylinder 22 per minute, and no hydraulic oil is supplied from the arm flow rate control valve 42[1] to the arm cylinder 22 in the second-group flow rate control valves 420. That is, the distribution control unit 9N outputs a control command for adjusting the opening area of the second-group flow rate control valves 420 such that the higher the priority in the second-group flow rate control valves 420, the higher the flow rate of the hydraulic oil supplied from the arm flow rate control valve 42[*i*] to the arm cylinder 22, and the lower the priority, the lower the flow rate of the hydraulic oil supplied from the arm flow rate control valve 42[*i*] to the arm cylinder 22.

[Computer System]

Figure 9:
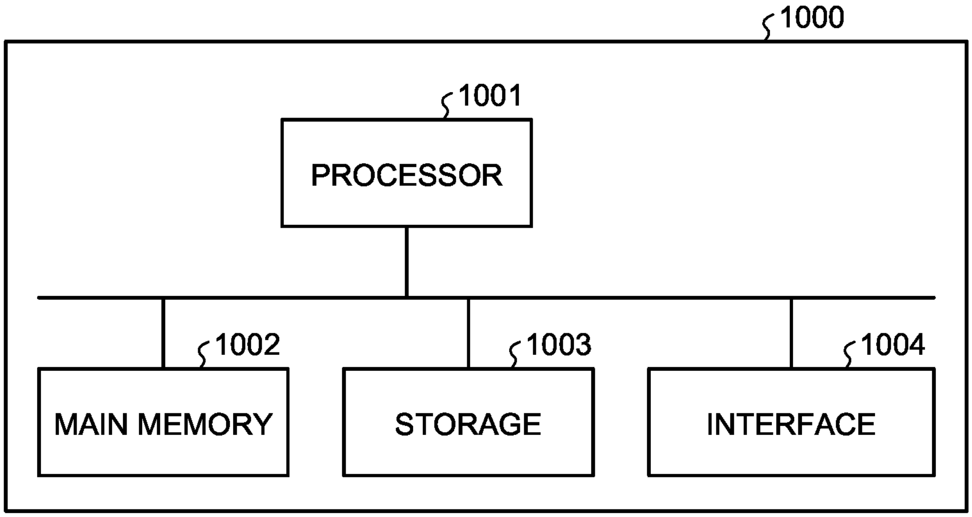
FIG. 9 is a block diagram illustrating a computer system according to the embodiment.

FIG. 9 is a block diagram illustrating a computer system 1000 according to the embodiment. The above-described control device 9 includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The function of the control device 9 is stored in the storage 1003 as a computer program. The processor 1001 reads out the computer program from the storage 1003, develops the computer program in the main memory 1002, and executes the above-described processing according to the computer program. The computer program may be delivered to the computer system 1000 via a network.

According to the above-described embodiment, the computer program can execute acquiring an operation command output from the operation device 5, calculating, based on the operation command and correlation data between the operation amount of the operation device 5 and the target meter-in flow rate Qcyl indicating the target flow rate of hydraulic oil flowing into the inlet 2D of the hydraulic cylinder 2, the target meter-out flow rate Qo indicating the target flow rate of the hydraulic oil flowing out from the outlet 2C of the hydraulic cylinder 2, calculating the target opening area of the flow rate control valve 40 that adjusts the flow rate of the hydraulic oil supplied to the hydraulic cylinder 2 based on the target meter-out flow rate Qo, and outputting a control command to cause the flow rate control valve 40 to have the target opening area of the flow rate control valve 40.

Effects

As described above, according to the embodiment, the control system 10 includes the plurality of hydraulic pumps 32 that discharge hydraulic oil, the boom cylinder 21 that moves the boom 11, the plurality of boom flow rate control valves 41 that are respectively connected to the plurality of hydraulic pumps 32 and adjust a flow rate of the hydraulic oil supplied to the boom cylinder 21, the plurality of supply flow paths 37 that are respectively connected to the plurality of boom flow rate control valves 41, the meter-in flow path 72 that connects the collective part 37S of the plurality of supply flow paths 37 and the inlet 2D of the hydraulic oil of the boom cylinder 21, the plurality of discharge flow paths 36 that are respectively connected to the plurality of boom flow rate control valves 41, the meter-out flow path 71 that connects the collective part 36S of the plurality of discharge flow paths 36 and the outlet 2C of the hydraulic oil of the boom cylinder 21, and the throttle 51 disposed in the meter-out flow path 71. In a case where a plurality of boom flow rate control valves 41 are connected to one boom cylinder 21, the hydraulic oil flowing out from the boom cylinder 21 is discharged to the tank 35 via the meter-out flow path 71. An excessive restriction of the flow rate of the hydraulic oil discharged from the boom cylinder 21 is suppressed by disposing the throttle 51 in the meter-out flow path 71. For example, in the case where the throttle 51 is disposed only in the meter-out flow path 71, the flow rate of the hydraulic oil discharged from the boom cylinder 21 is not excessively limited as compared with the case where the throttle 51 is disposed in each of the plurality of discharge flow paths 36, and therefore, an excessive decrease in the cylinder speed of the boom cylinder 21 as compared with the cylinder speed specified by the operation device 5 is suppressed. Therefore, a decrease in work efficiency is suppressed.

The control device 9 includes the correlation data storage unit 9A that stores correlation data between the operation amount of the operation device 5 and the target meter-in flow rate Qcyl flowing into the inlet 2D of the boom cylinder 21, the operation command acquisition unit 9B that acquires the operation command of the operation device 5, the target meter-out flow rate calculation unit 9G that calculates the target meter-out flow rate Qo of the hydraulic oil flowing out from the outlet 2C based on the correlation data and the operation command, the control valve opening area calculation unit 9I that calculates the target opening area Ao of the boom flow rate control valve 41 based on the target meter-out flow rate Qo, and the control valve control unit 9L that outputs a control command to cause the boom flow rate control valve 41 to have the target opening area Ao of the boom flow rate control valve 41. Since the target opening area Ao of the boom flow rate control valve 41 is controlled based on the target meter-out flow rate Qo, an excessive decrease in the cylinder speed of the boom cylinder 21 as compared with the cylinder speed specified by the operation device 5 is suppressed. Therefore, a decrease in work efficiency is suppressed.

The control device 9 includes the target regeneration flow rate calculation unit 9E that calculates the target regeneration flow rate Qr of the hydraulic oil based on the target meter-in flow rate Qcyl, the regeneration valve opening area calculation unit 9J that calculates the target opening area Ar of the regeneration valve 52 based on the target regeneration flow rate Qr, the pressure Pi of the hydraulic oil flowing into the inlet 2D of the boom cylinder 21, and the pressure Po of the hydraulic oil flowing out from the outlet 2C of the boom cylinder 21, and the regeneration valve control unit 9M that outputs a control command to cause the regeneration valve 52 to have the target opening area Ar of the regeneration valve 52. Since the target opening area of the regeneration valve 52 is controlled based on the target regeneration flow rate Qr, an excessive decrease in the cylinder speed of the boom cylinder 21 as compared with the cylinder speed specified by the operation device 5 is suppressed. Therefore, a decrease in work efficiency is suppressed.

The flow rate control valves 40 include the first-group flow rate control valves 410 including a plurality of boom flow rate control valves 41 for which priority is set, and the second-group flow rate control valves 420 including a plurality of arm flow rate control valves 42 for which priority is set. The control device 9 includes the distribution control unit 9N that controls the opening area of the first-group flow rate control valves 410 based on the priority of the first-group flow rate control valves 410, a required flow rate of the hydraulic oil in the boom cylinder 21, and a required flow rate of the hydraulic oil in the arm cylinder 22. This allows each of the plurality of hydraulic cylinders 2 to be supplied with hydraulic oil at an appropriate flow rate.

Other Embodiments

In the above-described embodiment, the work machine 100 is an excavator. The work machine 100 is not limited as long as the work machine 100 includes the working equipment 1 and may be a wheel loader or a bulldozer.

In the above-described embodiment, each flow rate control valve 40 has priority of the supply of hydraulic oil to the boom cylinder 21 and the arm cylinder 22, but the present invention is not limited thereto. The bucket cylinder 23 may have priority.

In the above-described embodiment, three pressure sensors are provided to detect the pressure of hydraulic oil, but the present invention is not limited thereto. It is sufficient that the flow rate can be calculated from the pressure of the hydraulic oil flowing in and out from a hydraulic cylinder 20.

REFERENCE SIGNS LIST

1 WORKING EQUIPMENT
2 HYDRAULIC CYLINDER
2A BOTTOM CHAMBER
2B ROD CHAMBER
2C OUTLET (OPENING)
2D INLET (OPENING)
3 SWING BODY
4 TRAVEL BODY
4C CRAWLER BELT
5 OPERATION DEVICE
6 OPERATION ROOM
6S OPERATOR'S SEAT
7 MACHINE ROOM
9 CONTROL DEVICE
9A CORRELATION DATA STORAGE UNIT
9B OPERATION COMMAND ACQUISITION UNIT
9C PRESSURE DATA ACQUISITION UNIT
9D TARGET METER-IN FLOW RATE CALCULATION UNIT
9E TARGET REGENERATION FLOW RATE CALCULATION UNIT
9F TARGET PUMP FLOW RATE CALCULATION UNIT
9G TARGET METER-OUT FLOW RATE CALCULATION UNIT
9H TARGET PUMP CAPACITY CALCULATION UNIT
9I CONTROL VALVE OPENING AREA CALCULATION UNIT
9J REGENERATION VALVE OPENING AREA CALCULATION UNIT
9K PUMP CONTROL UNIT
9L CONTROL VALVE CONTROL UNIT
9M REGENERATION VALVE CONTROL UNIT
9N DISTRIBUTION CONTROL UNIT
10 CONTROL SYSTEM
11 BOOM
12 ARM
13 BUCKET
21 BOOM CYLINDER
22 ARM CYLINDER
23 BUCKET CYLINDER
30 ENGINE
31 POWER TRANSMISSION MECHANISM
32 HYDRAULIC PUMP
33 FIRST FLOW PATH
33A SUPPLY FLOW PATH
34 SECOND FLOW PATH
35 TANK
36 BOTTOM FLOW PATH (DISCHARGE FLOW PATH)
36S COLLECTIVE PART
37 ROD FLOW PATH (SUPPLY FLOW PATH)
37S COLLECTIVE PART
38 DISCHARGE FLOW PATH
39 TANK FLOW PATH
40 FLOW RATE CONTROL VALVE
41 BOOM FLOW RATE CONTROL VALVE
42 ARM FLOW RATE CONTROL VALVE
43 BUCKET FLOW RATE CONTROL VALVE
50 BLEED VALVE
51 THROTTLE
52 REGENERATION VALVE
53 SUCTION VALVE
61 PRESSURE SENSOR
62 PRESSURE SENSOR
63 PRESSURE SENSOR
71 COLLECTIVE FLOW PATH (METER-OUT FLOW PATH)

72 COLLECTIVE FLOW PATH (METER-IN FLOW PATH)
100 EXCAVATOR (WORK MACHINE)
AX1 ROTATION AXIS
AX2 ROTATION AXIS
AX3 ROTATION AXIS
P1 FIRST WORK POSITION
P2 SECOND WORK POSITION
P3 STOP POSITION
P4 DISCHARGE POSITION
P5 STOP POSITION
P6 STOP POSITION
P7 REGENERATION POSITION
Pa PUMP PORT
Pb BOTTOM PORT
Pc ROD PORT
Pd TANK PORT
Pe INFLOW PORT
Pf OUTFLOW PORT
Pg INFLOW PORT
Ph OUTFLOW PORT
Pi INFLOW PORT
Pj OUTFLOW PORT
RX SWING AXIS

The invention claimed is:

1. A control system for a work machine comprising:
- a plurality of hydraulic pumps that discharge hydraulic oil;
- a hydraulic cylinder that moves a working equipment element;
- a plurality of flow rate control valves that are respectively connected to the plurality of hydraulic pumps and adjust a flow rate of the hydraulic oil supplied to the hydraulic cylinder;
- a plurality of supply flow paths respectively connected to the plurality of flow rate control valves;
- a meter-in flow path that connects a collective part of the plurality of supply flow paths and an inlet of the hydraulic oil in the hydraulic cylinder;
- a plurality of discharge flow paths respectively connected to the plurality of flow rate control valves;
- a meter-out flow path that connects a collective part of the plurality of discharge flow paths and an outlet of the hydraulic oil in the hydraulic cylinder;
- a throttle disposed in the meter-out flow path; and
- a control device;

wherein
- the working equipment element includes a first working equipment element and a second working equipment element,
- the hydraulic cylinder includes a first hydraulic cylinder that moves the first working equipment element and a second hydraulic cylinder that moves the second working equipment element,
- the flow rate control valves include first-group flow rate control valves including a plurality of flow rate control valves for which priority is set, and second-group flow rate control valves including a plurality of flow rate control valves for which priority is set,
- the first-group flow rate control valves adjust a flow rate of the hydraulic oil supplied to the first hydraulic cylinder,
- the second-group flow rate control valves adjust a flow rate of the hydraulic oil supplied to the second hydraulic cylinder, and
- the control device includes a distribution control unit that controls an opening area of the first-group flow rate control valves based on the priority of the first-group flow rate control valves and a required flow rate of the hydraulic oil in the first hydraulic cylinder.

2. The control system for the work machine according to claim 1, wherein
- the working equipment element performs a lifting motion and a lowering motion with the hydraulic cylinder, and
- the meter-out flow path is connected to the outlet through which the hydraulic oil flows out in the lowering motion.

3. The control system for the work machine according to claim 2, wherein
- the throttle has an opening area smaller than a maximum opening area of the flow rate control valves.

4. A work machine comprising:
- a working equipment including a plurality of working equipment elements;
- a plurality of hydraulic cylinders that respectively operate the plurality of working equipment elements; and
- the control system for the work machine according to claim 1.

5. A control system for a work machine comprising:
- a plurality of hydraulic pumps that discharge hydraulic oil;
- a hydraulic cylinder that moves a working equipment element;
- a plurality of flow rate control valves that are respectively connected to the plurality of hydraulic pumps and adjust a flow rate of the hydraulic oil supplied to the hydraulic cylinder;
- a plurality of supply flow paths respectively connected to the plurality of flow rate control valves;
- a meter-in flow path that connects a collective part of the plurality of supply flow paths and an inlet of the hydraulic oil in the hydraulic cylinder;
- a plurality of discharge flow paths respectively connected to the plurality of flow rate control valves;
- a meter-out flow path that connects a collective part of the plurality of discharge flow paths and an outlet of the hydraulic oil in the hydraulic cylinder;
- a throttle disposed in the meter-out flow path
- an operation device that generates an operation command with an operation; and
- a control device,
- wherein the control device that
- stores correlation data between an operation amount of the operation device and a target meter-in flow rate indicating a target flow rate of the hydraulic oil flowing into the inlet;
- acquires the operation command;
- calculates a target meter-out flow rate indicating a target flow rate of the hydraulic oil flowing out from the outlet based on the correlation data and the operation command;
- calculates a target opening area of the flow rate control valves based on the target meter-out flow rate; and
- outputs a control command to cause the flow rate control valves to have the target opening area of the flow rate control valves.

6. The control system for the work machine according to claim 5, the control system comprising:
- a regeneration valve that adjusts a regeneration flow rate of the hydraulic oil regenerated from the meter-out flow path to the meter-in flow path,
- wherein the control device that:
- calculates a target regeneration flow rate of the hydraulic oil based on the target meter-in flow rate;

calculates a target opening area of the regeneration valve based on the target regeneration flow rate, a pressure of the hydraulic oil flowing into the inlet, and a pressure of the hydraulic oil flowing out from the outlet; and outputs a control command to cause the regeneration valve to have the target opening area of the regeneration valve.

7. A control system for the work machine comprising:

a plurality of hydraulic pumps that discharge hydraulic oil;

a hydraulic cylinder that moves a working equipment element;

a plurality of flow rate control valves that are respectively connected to the plurality of hydraulic pumps and adjust a flow rate of the hydraulic oil supplied to the hydraulic cylinder;

a plurality of supply flow paths respectively connected to the plurality of flow rate control valves;

a meter-in flow path that connects a collective part of the plurality of supply flow paths and an inlet of the hydraulic oil in the hydraulic cylinder;

a plurality of discharge flow paths respectively connected to the plurality of flow rate control valves;

a meter-out flow path that connects a collective part of the plurality of discharge flow paths and an outlet of the hydraulic oil in the hydraulic cylinder;

a throttle disposed in the meter-out flow path an operation device that generates an operation command with an operation; and a control device, wherein the control device stores correlation data between an operation amount of the operation device and a target meter-in flow rate indicating a target flow rate of the hydraulic oil flowing into the inlet;

acquires the operation command;

calculates a target meter-out flow rate indicating a target flow rate of the hydraulic oil flowing out from the outlet based on the correlation data and the operation command;

calculates a target opening area of the flow rate control valves based on the target meter-out flow rate; and outputs a control command to cause the flow rate control valves to have the target opening area of the flow rate control valves;

wherein the working equipment element includes a first working equipment element and a second working equipment element, the hydraulic cylinder includes a first hydraulic cylinder that moves the first working equipment element and a second hydraulic cylinder that moves the second working equipment element, the flow rate control valves include first-group flow rate control valves including a plurality of flow rate control valves for which priority is set, and second-group flow rate control valves including a plurality of flow rate control valves for which priority is set, the first-group flow rate control valves adjust a flow rate of the hydraulic oil supplied to the first hydraulic cylinder, the second-group flow rate control valves adjust a flow rate of the hydraulic oil supplied to the second hydraulic cylinder, and the control device includes a distribution control unit that controls an opening area of the first-group flow rate control valves based on the priority of the first-group flow rate control valves and a required flow rate of the hydraulic oil in the first hydraulic cylinder.

* * * * *